United States Patent
Liu et al.

(10) Patent No.: US 6,737,763 B2
(45) Date of Patent: May 18, 2004

(54) INTELLIGENT LOAD SHARING WITH POWER LIMITING SCHEME FOR MULTIPLE POWER SUPPLIES CONNECTED TO A COMMON LOAD

(75) Inventors: Jixue J. Liu, Palo Alto, CA (US); Zahid Najam, San Jose, CA (US)

(73) Assignee: Cloudshield Technologies, Inc., Sunnyvale, CA (US)

(*) Notice: Subject to any disclaimer, the term of this patent is extended or adjusted under 35 U.S.C. 154(b) by 143 days.

(21) Appl. No.: 10/024,866

(22) Filed: Dec. 17, 2001

(65) Prior Publication Data

US 2003/0111909 A1 Jun. 19, 2003

(51) Int. Cl.[7] ................................. H02J 1/10
(52) U.S. Cl. ..................... 307/58; 323/272; 363/65
(58) Field of Search ................ 307/58, 82; 323/268, 323/272; 363/65, 70, 71, 72

(56) References Cited

U.S. PATENT DOCUMENTS

| | | | | |
|---|---|---|---|---|
| 4,150,425 A | * | 4/1979 | Nagano et al. | 307/82 |
| 4,729,086 A | * | 3/1988 | Lethellier | 307/58 |
| 4,766,364 A | * | 8/1988 | Biamonte et al. | 323/272 |
| 5,319,536 A | * | 6/1994 | Malik | 363/65 |
| 5,390,081 A | | 2/1995 | St. Pierre | 361/775 |
| 5,428,523 A | * | 6/1995 | McDonnal | 363/71 |
| 5,612,854 A | | 3/1997 | Wiscombe et al. | 361/727 |
| 5,745,355 A | * | 4/1998 | Tracy et al. | 363/71 |
| 5,757,634 A | * | 5/1998 | Ferens | 363/72 |
| 5,847,950 A | * | 12/1998 | Bhagwat | 363/65 |
| 6,158,553 A | * | 12/2000 | Oshima et al. | 363/71 |
| 6,191,569 B1 | * | 2/2001 | Arbetter et al. | 323/272 |
| 6,294,848 B1 | | 9/2001 | Goodrich, II | 307/147 |
| 6,301,133 B1 | * | 10/2001 | Cuadra et al. | 363/65 |
| 6,317,345 B1 | | 11/2001 | Hayward et al. | 363/65 |
| 6,329,726 B1 | * | 12/2001 | Lau et al. | 307/58 |
| 6,425,027 B1 | | 7/2002 | Mills et al. | 710/101 |

OTHER PUBLICATIONS

Linear Technology Datasheet: Product LTC4350, found at http://www.linear-tech.com/prod/datasheet.html-?datasheet=753, Dec. 13, 2001, pp. 1–2.

Philips Product Information Sheet: PCF8591; 8–bit A/D and D/A converter, found at http://www.google.com/search?q=cache : Q8NeYHBur28: www-us . semiconductors . philips. com/pip/PCF8591P+pcf8591&hl=en , Dec. 13, 2001, pp. 1–4.

Philips Product Information Sheet: NE/SA, SE555, SE555C; Timer, found at http://www.google.com/search?q=cache : qCv6MQKcxu8 : www-us . semiconductors.philips. com/pip/NE555D=ne555n&hl=en , Dec. 13, 2001, pp. 1–4.

(List continued on next page.)

*Primary Examiner*—Jeffrey Sterrett
(74) *Attorney, Agent, or Firm*—Brinks Hofer Gilson & Lione

(57) ABSTRACT

A system and method for distributing power to multiple circuit boards coupled with a "system" backplane is disclosed. Separate redundant pairs of power supplies are provided for each circuit board in a load sharing arrangement. Each set of power supplies and their load, i.e. the circuit board to which they are coupled and providing power to, are isolated from the other sets. The power supplies are coupled with a second "power" backplane which interconnects the redundant power supply pairs as well as receives the input voltage and current from a source and distributes it to all of the power supplies. The power backplane is further coupled with the system backplane in a back to back arrangement to effect the connection of the power supplies with their respective loads. The redundant power supplies in combination with fault monitoring and failure handling logic identify and isolate faults, enable fail-over operation and prevent collateral damage to other system components.

20 Claims, 41 Drawing Sheets

OTHER PUBLICATIONS

Linear Technology Press Release "LT1640: High Voltage Controller For Hot Swapping −48V DC/DC Converter Modules Compact, Integrated Solution Protects Boards During Live Insertion or Removal", Jul. 1998, found at http://www.linear−tech.com/pub/document.html?pub type=pr&document=22 , Dec. 13, 2001, pp. 1–2.

Ericsson Microelectronics DC/DC Power Modules product brochure, May 2001, pp 1–16.

Ericsson Components AB PKJ 4000 PI 37.5–150W DC/DC Power Modules 48V Input Series Preliminary Data Sheet, Aug. 1999, pp. 1–20.

* cited by examiner

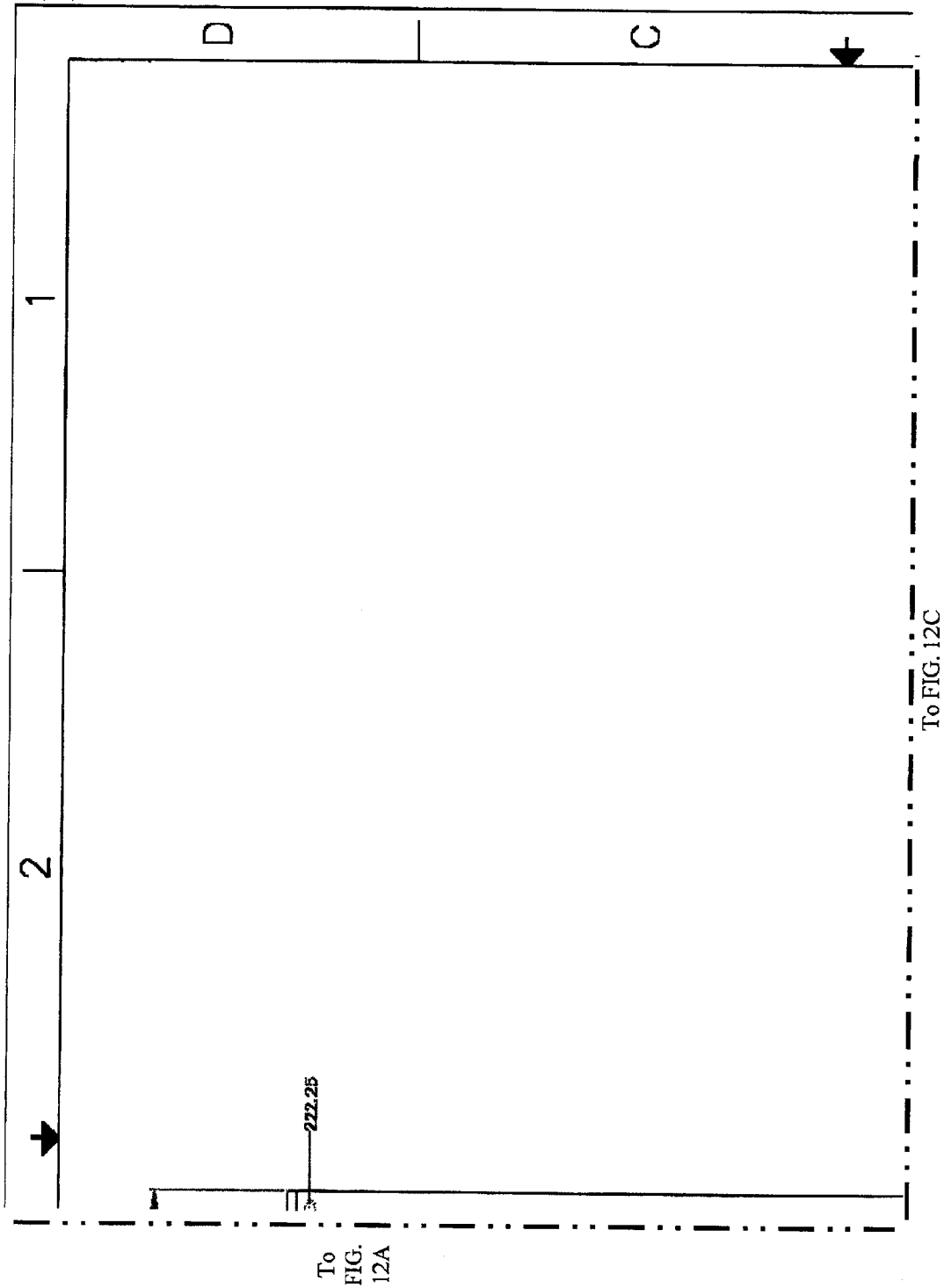

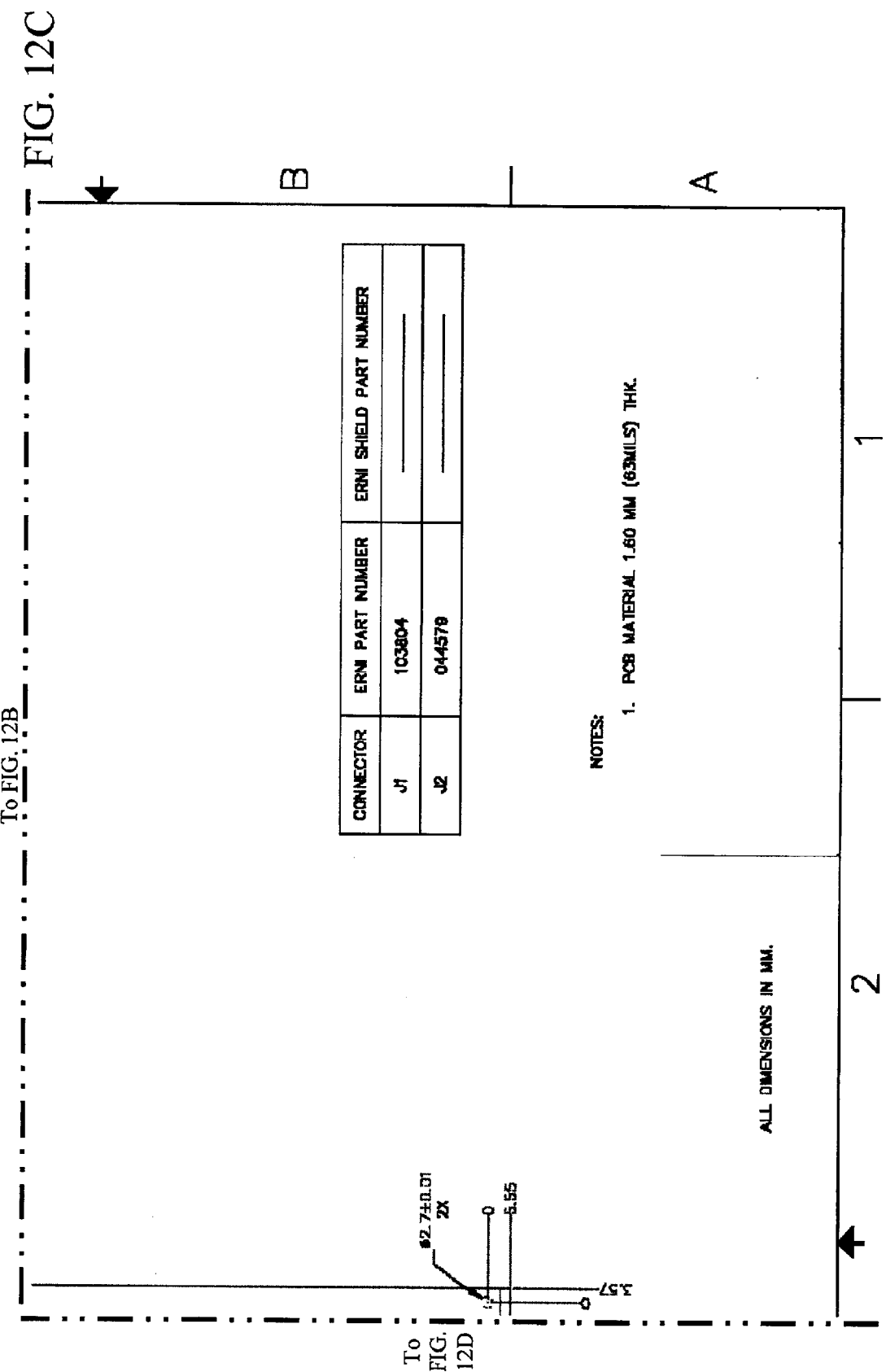

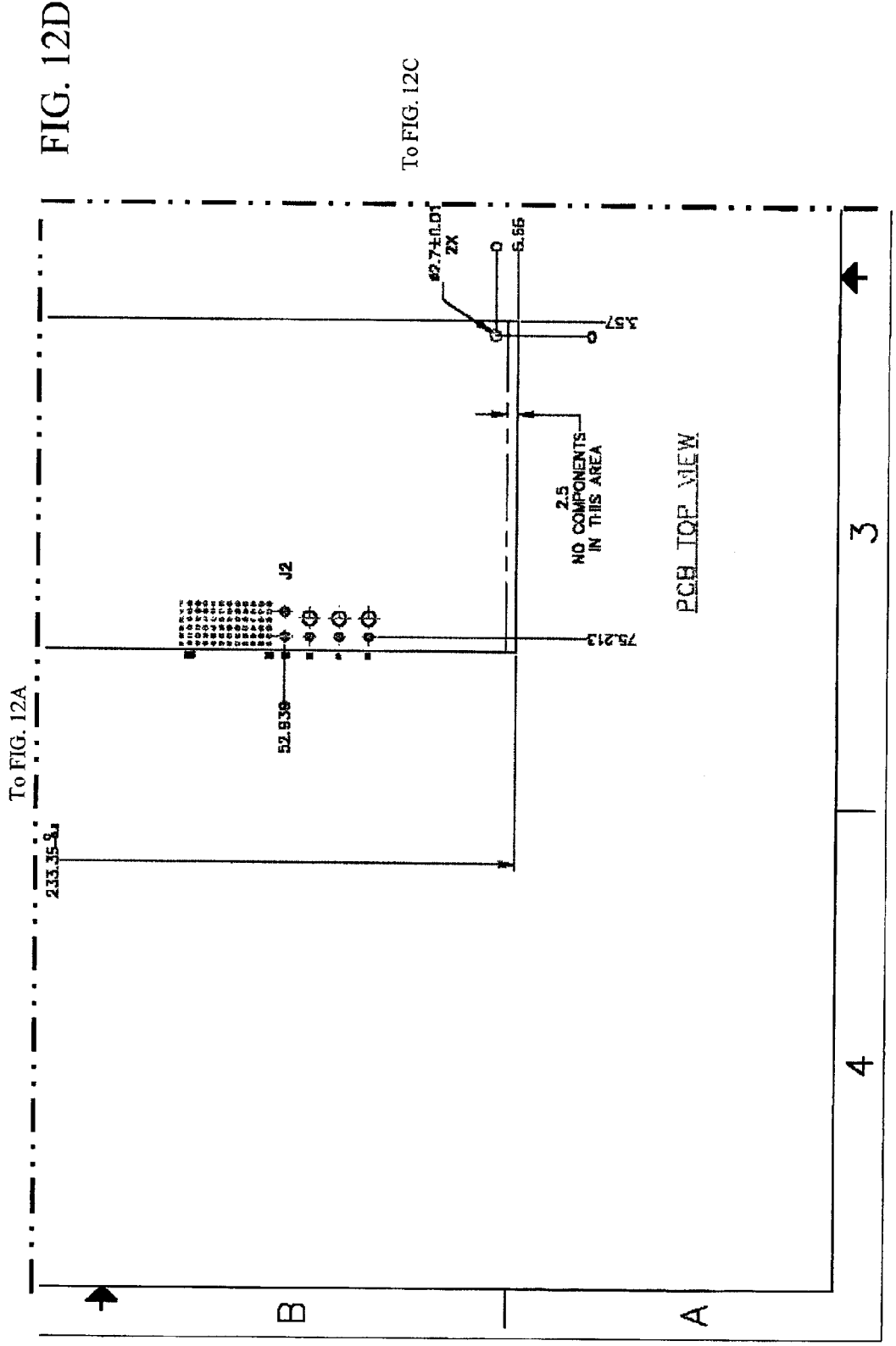

ced as N+1 redundancy. However,

INTELLIGENT LOAD SHARING WITH POWER LIMITING SCHEME FOR MULTIPLE POWER SUPPLIES CONNECTED TO A COMMON LOAD

RELATED APPLICATIONS

The following co-pending and commonly assigned U.S. patent application has been filed on the same date as the present application. This application relates to and further describes other aspects of the embodiments disclosed in the present application and is herein incorporated by reference.

U.S. patent application Ser. No. 10/024,825, "SYSTEM AND METHOD FOR DISTRIBUTED POWER SUPPLY SUPPORTING HIGH CURRENTS WITH REDUNDANCY", now U.S. Pat. No. 6,661,119, filed herewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Contemporary electronic systems, particularly industrial or enterprise scale computer or networking systems, typically utilize a physical/mechanical design wherein the various components of the system reside on a number of individual circuit boards which are interconnected via a common backplane circuit board. This type of physical implementation has the advantages of efficient and economical component interconnection and use of physical space, especially for highly reliable/redundant systems, as well as allowing for efficient and economical cooling and maintenance. Electronic backplanes, also referred to as motherboards, serve as a communication medium for the exchange of electronic signals between the various circuit boards. These same backplanes also serve as a vehicle for providing electrical power to the circuit boards.

Power is generated, i.e. converted from a source/input into various voltages and currents required by the various system components, at one or more power supplies and is distributed to the circuit boards via the backplane. A backplane is itself a printed circuit board, often having multiple layers, with a number of sockets/connectors mounted thereon for receiving the other circuit boards which make up the system. The backplane contains the wiring, also referred to as traces, to interconnect the circuit boards, i.e. signal traces or signal busses, as well as provides and distributes power to the circuit boards, i.e. power distribution traces, busses or power rails.

In one prior art system, the system power converter/supply is itself carried on one of the circuit boards plugged into the backplane. The system power supply receives AC power from the local power grid and provides one or more DC voltages to the backplane via its interconnect. Each of the other circuit boards plugged-in to the backplane receives these DC voltages via the power distribution traces and uses the voltages as needed to power their circuitry. Most of the circuits used in typical electronics/computer applications require lower voltages to operate, typically 1.8, 2.0, 3.3 and/or 5 volts. The power supply/converter converts the AC input into the necessary lower voltages. To ensure fault tolerance, an additional redundant system power supply may be provided, often referred to as N+1 redundancy. However, a number of problems have been recognized with this approach. For example, because all of the system components derive their operating power from a single power supply or set of power supplies as well as share a common ground plane, it is difficult to isolate faults to a failing component and minimize collateral damage to functioning components. Further, the additional power supply rails in the backplane use more of the available spaces in the backplane sockets as well as more of the available trace routing area, increase resistive losses and increase system noise. These problems are exacerbated in more advanced systems wherein higher current demands necessitate a more robust power distribution architecture, i.e. thicker and/or more numerous traces. In addition, the power supply/converter consumes a valuable slot on the backplane which could be used for another circuit board. In fault-tolerant/redundant systems, the redundant power supplies consume even more available space/slots.

Use of a distributed power arrangement rather than a centralized arrangement avoids these problems. In a distributed power system, the main power supply provides only one relatively low current/high voltage level, typically 12 to 48 volts, to the backplane, also referred to as an intermediate voltage. The lower voltages are provided by power converters located directly on each circuit board. This helps reduce system noise by isolating functional blocks and allows for some measure of failure isolation. Further, each converter can be optimally sized for the functional circuitry on its own circuit board. In addition, the main power supply need not be closely regulated, since the distributed converters provide control on each board. However, in this configuration, the DC power converters consume valuable circuit board space and create electrical noise and heat on the circuit boards. Further, because each circuit board requires separate DC-input power supplies, the system level cost is significantly increased. In systems requiring redundant components for reliability, redundancy for DC-input power supply fault tolerance requires duplication of components on each circuit board, greatly increasing cost and occupation of space. In addition, power converters located on the circuit boards may interfere with hot swapping, i.e. plugging in or removing boards while the power is on.

In another prior art system, one or more free-standing, separately housed power supplies are mounted within the system enclosure and connected to the backplane via bundles of high-current capacity wires or solid metal distribution bars, known as bus bars, to supply power to all of the circuit boards in the system. These free-standing power supplies are typically self-contained power supply systems, having their own enclosures. This configuration yields several undesirable performance problems. The power supply enclosure adds to the physical weight, cost, and size of the power supply. This configuration typically includes a cooling fan that must be integrated into the airflow management design of the enclosure further adding cost and addition acoustic noise. Since current drawn from the power supply is application dependent, the current capacity of the power supply often must change with application, necessitating a change in the power supply configuration. As free-standing units, the power supplies are coupled to the backplane via bus bars or bundles of high-current wires. The size, quantity, and configuration of these wires is application dependent and therefore must be reconfigured according to the application and current capacity thereof. Because the power rating of the power supply is driven by the worst case requirement of any single direct current (DC) voltage, the power supply selected for an application is typically larger than required. These power supplies tend to be available in standard sizes that offer limited choices, for example such that a need for increased current at 5 Volts will result in more current being generated at the other voltages as well, even if not required for the application.

Further, contemporary system applications demand fault-tolerant operation. This demand drives a need for fault-tolerant, redundant power supplies having current sharing and hot swap capability. A typical embodiment employs fully redundant power supplies, significantly increasing physical space, weight, and cost, Assuming that each unit is a free-standing power supply with multiple output voltages and high-current capacity, a small number, for example 3, power supplies are commonly employed in redundant systems. This requires significantly more power capacity, for example 50%, than a non-redundant system, such that the system will continue to perform with uninterrupted operation if one of the power supplies fails.

In addition, another problem with redundant solutions in prior art system is that, because the redundant power supplies are connected together with the load, the redundant supply must remain turned off when the main supply is operating correctly, in order not to overload the load or connections therewith. When the main supply fails, the redundant supply must then turn on to keep the load operating. The delay in ramping up the redundant supply to full power must be accounted for in the operational characteristics of the load so that the load does not fail due to the interruption. This necessarily places design constraints on the design of the load circuit board. Further, the second power supply must not accidentally power on while the first power supply is active or catastrophic results may occur due to an overload.

Accordingly, there is a need for a power supply and distribution system which provides redundant/fault-tolerant operation while supporting high current demands with reduced electrical noise. Further, there is a need for a power supply and distribution system which isolates faults and mitigates collateral damage to non-failing components when failures occur.

SUMMARY

The present invention is defined by the following claims, and nothing in this section should be taken as a limitation on those claims. By way of introduction, the preferred embodiments described below relate to a system for supplying electrical power to a load characterized by an electrical power requirement. The system includes first and second power supplies coupled with the load and operative to supply electrical power to meet the electrical power requirement such that the first power supply supplies a portion of the electrical power not supplied by the second power supply. The system further includes a power supply controller coupled with the first and second power supplies and the load monitor and operative to detect failure of the second power supply, the power supply controller being further operative to adjust the first power supply to supply the electrical power requirement upon failure of the second power supply and prevent the first power supply from supplying more than the portion of the electrical power not supplied by the second power supply where the second power supply has not failed.

The preferred embodiments further relate to a method for supplying electrical power to a load using first and second power supplies each coupled with the load, the load characterized by an electrical power requirement. In one embodiment, the method includes supplying electrical power to meet the electrical power requirement such that the first power supply supplies a portion of the electrical power not supplied by the second power supply, detecting failure of the second power supply, adjusting the first power supply to supply the electrical power requirement upon the detection, and preventing the first power supply from supplying more than the portion of the electrical power not supplied by the second power supply where the second power supply has not failed.

Further aspects and advantages of the invention are discussed below in conjunction with the preferred embodiments.

BRIEF DESCRIPTION OF THE DRAWINGS

FIGS. 12A–12D depict a schematic diagram of physical design of a power supply circuit board for use with the embodiment of FIGS. 1 and 2.

DETAILED DESCRIPTION OF THE PRESENTLY PREFERRED EMBODIMENTS

Figure 1:
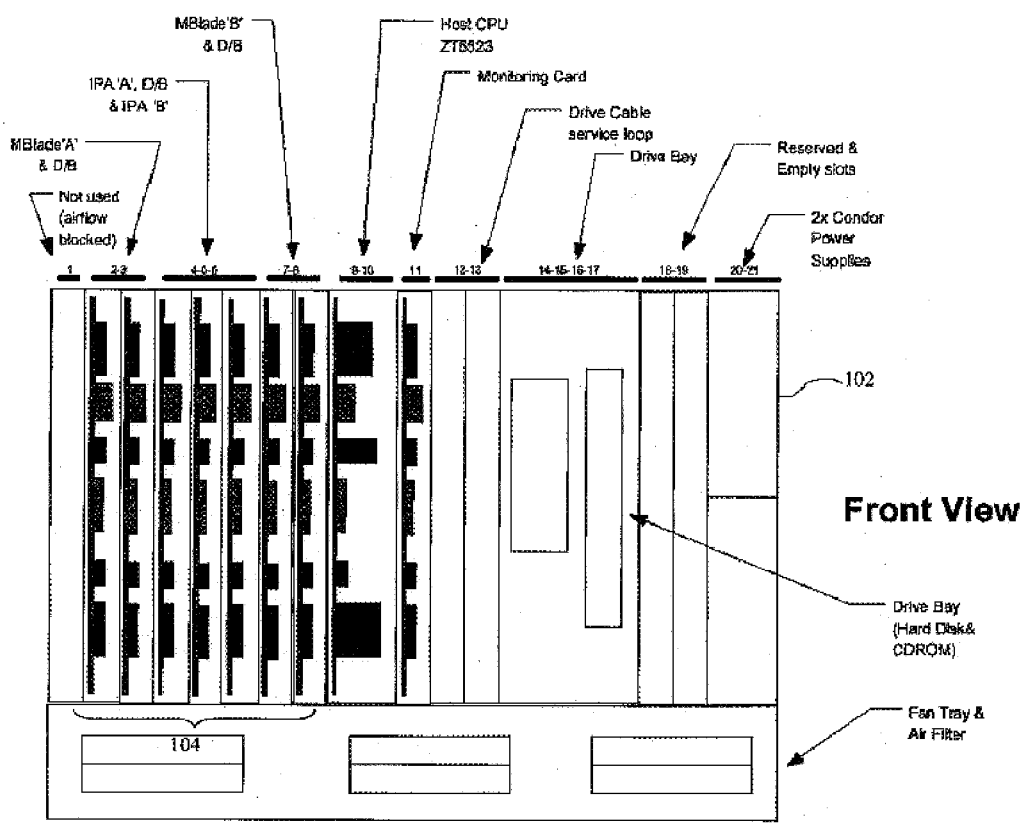
FIG. 1 depicts a front view of an exemplary computer system according to one embodiment.

The disclosed embodiments related to a system and method for distributing power to multiple circuit boards coupled with a "system" backplane. In one embodiment, separate redundant pairs of power supplies are provided for each circuit board in a load sharing arrangement, described in more detail below. Herein, the terms "power supply" or "power converter" are used interchangeably to refer to a device which receives an input voltage and current, which may come from another power supply or from a local power grid, and converts the input voltage and current into an output voltage and current different from the input. Further, it will be appreciated that the term "power" refers to either the current, voltage or both being supplied to a given load. Each set of power supplies and their load, i.e. the circuit board to which they are coupled and providing power to, are isolated from the other sets, e.g. they do not share a common power distribution bus or a common ground plane on the power backplane, described below. It will be appreciated by those skilled in the art, that all of the components in the system eventually ground at a common point, typically at the device chassis. In the disclosed embodiments, the power supplies and loads are eventually grounded on the system backplane, however, regarding the path of power flow from the power input to the power supplies to the power inputs to the load, there is no common grounding point between the separate redundant pairs of power supplies. The power supplies are coupled with a second "power" backplane which interconnects the redundant power supply pairs as well as receives the input voltage and current from a source and distributes it to all of the power supplies. The power backplane is further coupled with the system backplane in a back to back arrangement to effect the connection of the power supplies with their respective loads.

In the disclosed embodiments, the circuit board power supplies receive a high voltage input from one or more system input power supplies, depending on the level of redundancy provided. The system power supplies are coupled with an AC electric power supply grid. The system power supplies convert the AC line input from the power grid into a high voltage DC power supply using a diode assembly. Herein, the phrase "coupled with" is defined to mean directly connected to or indirectly connected through one or more intermediate components. Such intermediate components may include both hardware and software based components.

Aside from supplying the high voltage input to the circuit board power supplies, the system input power supplies supply power to auxiliary devices such as cooling fans and system monitoring/management systems. In an alternate embodiment, the high voltage DC input may come from a source external to the system, rather than a dedicated AC to DC power supply, as is common in carrier environments. As will be described, the circuit board power supplies convert the high voltage input into low voltage high current outputs to their associated circuit boards. In one embodiment, the high voltage DC power supply is −48 Volts at approximately 20 Amps, system wide with each circuit board power supply drawing approximately 1–3 Amps each. Further, two types of circuit board power supplies are provided, one which converts the −48 Volt input into 2.0 Volts at 8–15 Amps and 3.3 Volts at 40 Amps and the other which converts the −48 Volt input into 1.8 Volts at 40 Amps and 3.3 Volts at 10 Amps. It will be appreciated that the input voltage and current as well as the outputs of the power supplies are implementation dependent. Note that by converting the −48 Volt high voltage DC power supply directly into the required voltages using the circuit board power supplies, intermediary voltage conversions by the circuit boards themselves are unnecessary which saves physical space on the circuit boards and enhances reliability through lower complexity of the circuit boards.

As was described, high performance computing/processing systems utilize a significant amount of power which must be reliably distributed to the various components of the system. In one exemplary embodiment, a single circuit board may demand up to 40 Amps of operating power. Further, as such systems often serve in mission critical roles, fault tolerance and ease of maintenance are preferred. This is often referred to as Reliability, Availability and Serviceability ("RAS"). Prior power distribution architectures for backplane based processing systems inefficiently utilized portions of the system backplane as the distribution medium or required the individual system components to provide their own on-board power supplies, including redundant components. In other distributed power architectures, a few separate power supplies were provided for the backplane and attached circuit boards, however distributing the low voltage high current signals necessitated a complex network of power distribution cables or bus bars.

To provide reliability and availability, the disclosed embodiments provide redundant components in combination with fault monitoring and failure handling logic in a configuration which identifies and isolates faults, enables fail-over operations and prevents collateral damage to other system components. To provide availability and serviceability, the disclosed embodiments provide complete "hot-swap" capabilities for all of the redundant power supplies. Hot-swap refers to the capability of adding and removing components to a system without turning the system or any components thereof (except the component being hot swapped), off or otherwise deactivating the system, or any components thereof, or inhibiting system performance and without damaging the system or the component(s) being added or removed. Components may be hot-swapped at any time regardless of the whether a component has failed or not. It will be appreciated that removing both power supplies of a redundant pair will deactivate the load to which they were supplying power.

As described above, each circuit board is supported by its own set of redundant power supplies which supply the power necessary for operating the circuit board in a load sharing fashion. In one embodiment, two redundant power supplies are provided for each circuit board. In a load sharing arrangement, each power supply essentially supplies the portion of electrical power not supplied by the other supply. Under normal operating circumstances, each of the redundant supplies provides approximately ½ of the required power, within a certain operating margin, e.g. +/−2%, which may vary. Where one supply fails or is removed from the system, i.e. supplies zero power, the other power supply ramps up to provide all of the power required by the load. Further, each set of redundant power supplies is isolated from the other sets of power supplies thereby isolating any faults. A general system monitor is also coupled with all of the power supplies to monitor overall system health, detect component failures and take appropriate action during minor or catastrophic events.

In addition, the power supplies are coupled with their respective loads using a dual backplane design. The loads/circuit boards are plugged into a system backplane while the power supplies are plugged into a power backplane. The power backplane further plugs onto the back side of the system backplane via a set of inter-backplane connectors, one for each load. These connectors effect all of the power and signaling connections required for each load and associated redundant power supply pair via their connector pins, described in more detail below. The power backplane further interconnects each of the power supplies in a redundant pair together and with the associated inter-backplane connector to the system backplane and respective load, thereby eliminating the need for wires and/or bus bars to distribute the power to the circuit boards. The power backplane further interconnects all of the power supplies with the −48 Volt input power source and with the system monitoring and control logic, again eliminating the need for wire and/or bus bars to distribute the input power or signaling to the power supplies. Power delivery from the power backplane to the loads is effected over straight thru connector pins of the inter-backplane connectors which pass through the system backplane, orthogonal to the system backplane, directly to the connectors on the front side of the system backplane which receive the circuit boards. In this way, power is delivered directly to the input pins of the circuit board, eliminating the need for any distribution busses/traces on the system backplane. Each voltage being delivered from the power supplies to the circuit boards may be carried on one or more of the inter-backplane connector pins and/or the inter-backplane connector pins may be increased in size to further distribute and handle the current load safely and efficiently. It will be appreciated that backplane traces having the equivalent current carrying capabilities as the inter-backplane connector pins would have to be substantial in dimensions so as not to overload and potentially melt under the current demand of the circuit boards. By delivering the power using one or more connector pins, directly to the circuit board inputs, substantial savings in routing area on the system backplane is realized. Further, overall electrical noise on the system backplane is reduced and thermal side effects are minimized.

FIG. 1 depicts a front view of an exemplary computer system 102 according to one embodiment. The exemplary computer system is a CS-5000™ packet processor manufactured by Cloudshield Technologies, Inc., located in San Jose, Calif. The packet processor intercepts and processes data packets from a network such as the Internet. It will be appreciated, however, that the disclosed embodiments are applicable to computer systems in general, whether general purpose or application specific in task, such as computer servers or telecommunications devices. The exemplary computer system includes dedicated processing circuit boards 104 as well as other supporting hardware. In the exemplary system 102, there are seven dedicated processing circuit boards 104, which will also be referred to herein as "loads". For the purposes of this disclosure, there are two types of processing circuit boards 104, those that require 3.3 Volt and 2.0 Volt power and those that require 1.8 Volt and 3.3 Volt power, as will be discussed in more detail below. It will further be appreciated that other voltages may be used/required and other components of the system 102 may also use the disclosed embodiments for their power requirements and that this is specific to the design and implementation of the system 102.

Figure 2:
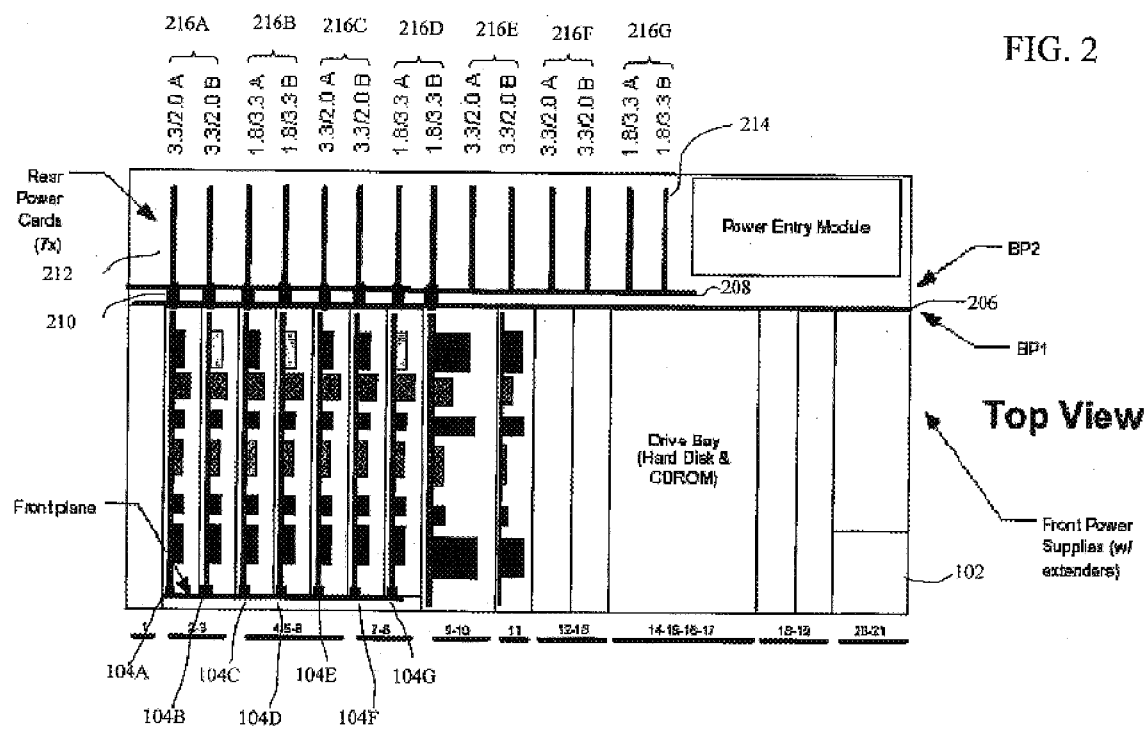
FIG. 2 depicts a top view of the exemplary computer system of FIG. 1.

FIG. 2 depicts a top view of the exemplary computer system 102 of FIG. 1. As was discussed, the system 102 includes seven processing circuit boards or loads 104A–G. The circuit boards 104A–G are plugged into slots (not shown) located on one side of a system backplane 206. The system backplane 206 provides signal interconnection between the circuit boards 104A–G as well as between other system 102 components. In one embodiment, a front plane is also provided to further interconnect the circuit boards 104A–G. The system 102 further includes a power backplane 208 coupled with the back side (opposite the slots for the circuit boards 104A–G) of the system backplane 206 via connectors 210, described in more detail below, in a back to back arrangement, one connector for each circuit board 104A–G. Each of the connectors 210 is directly associated with the power inputs of one of the circuit boards 104A–G, the pins of which effect direct power connections from the power backplane 208 to the power inputs of the circuit boards 104A–G, as described above. Power supply boards 212, 214 are plugged into slots (not shown) mounted on the power backplane 208 on the face opposite the connectors 210.

There are two types of power supply boards 212, 214, one type 212 converts the −48 Volt system input into 3.3 Volts @ 40 Amps and 2.0 Volts @ 8–15 Amps (referred to herein as a "2.0 Volt supply 212") while the other type 214 converts the −48 Volt system input into 1.8 Volts @ 40 Amps and 3.3 Volts @ 10 Amps (referred to herein as a "1.8 Volt supply 214"). Two redundant identical power supply boards 212, 214 are provided to power each circuit board 104A–G. The power supply boards 212, 214 in each set 216A–G are located in adjacent slots on the power backplane 208. In the exemplary embodiment having seven circuit boards 104A–G, there are fourteen power supply boards 212, 214 grouped as redundant sets of two 216A–G. Of the fourteen power supply boards 212, 214, eight, or four sets 216A, 216C, 216E, 216F, are of the 2.0 Volt supply 212 type, and six, or three sets 216B, 216D and 216G are of the 1.8 Volt Supply 214 type. It will be appreciated that the level of redundancy may be increased such as by providing three or four power supply boards 212, 214 per circuit board/load 104A–G, and that such increases in fault tolerance are contemplated.

Each pair of power supply boards 216A–G is coupled with one of the connectors 210 which couples the associated pair of power supply boards 216A–G with one of the circuit boards 104A–G via the connector 210 pins which pass through the system backplane 206. Due to the 2:1 ratio of power supply boards 212, 214 to circuit boards 104A–G, the physical location of the power supply board sets 216A–G on the power backplane 208 is gradually offset from their respective connector 210 and circuit board/load 104A–G on the system backplane 206. The power backplane 208 provides the interconnections to couple the redundant power supply pairs 216A–G together and with their associated connector 210 to effect a load sharing connection with the associate circuit board/load 104A–G despite the offset location. Further, the interconnections of each power supply pair 216A–G with their associated circuit board/load 104A–G are localized and completely isolated from each other. This provides fault isolation and prevents faults in one power supply pair 216A–G or load 104A–G from affecting the other power supply pairs 216A–G and loads 104A–G. For example, a short circuit within the load 104A–G or its associated power supplies 212, 214 will be isolated from the other loads 104A–G and power supplies 212, 214. In addition, by using pluggable power supply boards 212, 214, hot swapping is more easily supported. Further, very high power distribution can be effectively and efficiently performed because the current delivered by the power supply boards 212, 214 is separately distributed over multiple portions of the power backplane 208.

The power backplane 208 further interconnects the power supply boards 212, 214 with the system power input (not shown) and other components of the system 102 such as the Monitoring and Peripheral Management Module ("MAPM") card (not shown) which manages and monitors overall system 102 environmental and mechanical parameters such as system power distribution and cooling.

Utilizing a dual backplane arrangement with a system backplane 206 and a power backplane 208 in a back to back arrangement eliminates the need for power distribution cables and/or bus bars to distribute power to the circuit boards/loads 104A–G as well as simplifies distribution of the system input power to the power supply boards 212, 214. Further, the power backplane 208 simplifies isolating the connections between the power supply pairs 216A–G and loads 104A–G from each other.

A dual backplane arrangement further allows the use of standard through hole components and connectors. It will be appreciated however, that a single backplane design may be used in which the circuit boards 104A–G are plugged into one side and the power supply boards 212, 214 are plugged into the other, using suitable connectors and components as well as a suitable backplane supporting all of the necessary routing.

Figure 3:
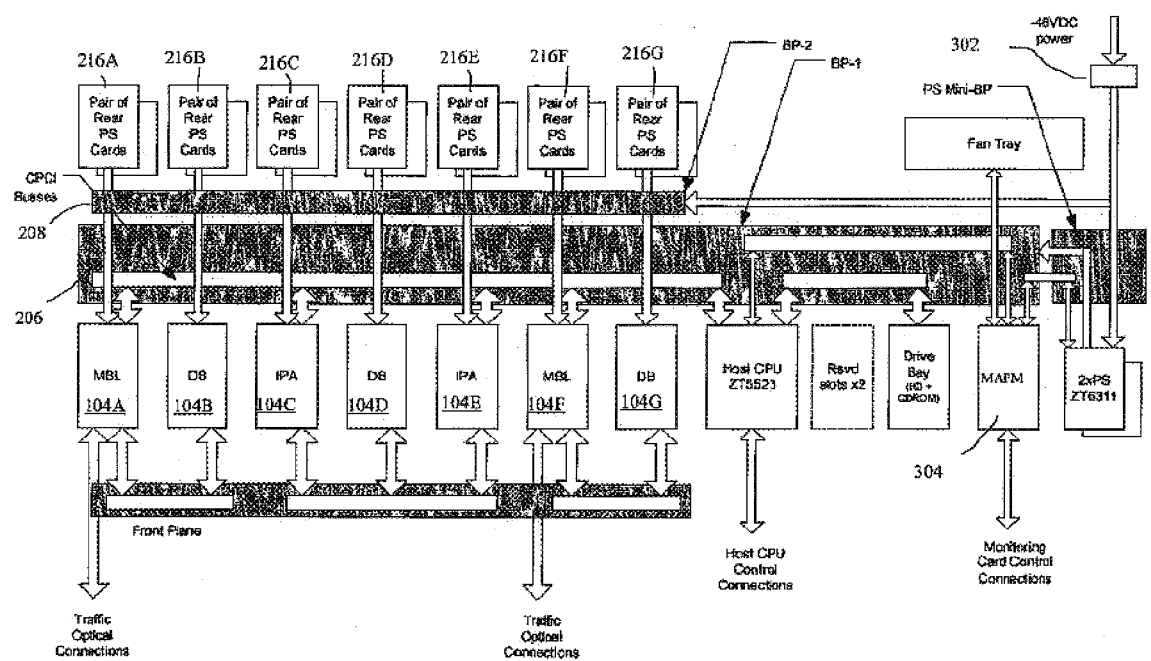
FIG. 3 depicts a schematic diagram showing various interconnections of the computer system of FIGS. 1 and 2.
Figure 4:
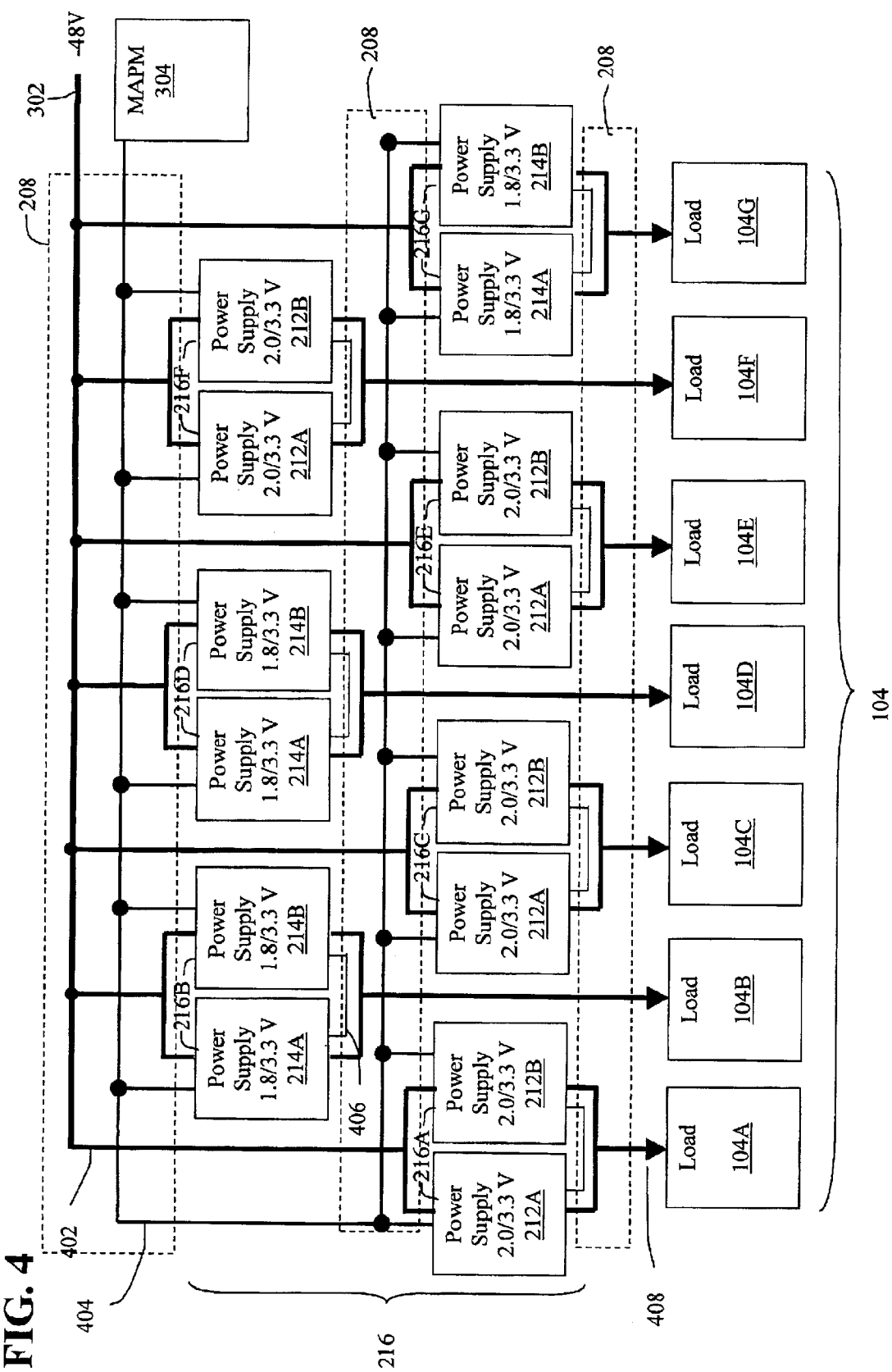
FIG. 4 depicts a block diagram showing various interconnections of the computer system of FIGS. 1 and 2.
Figure 7:
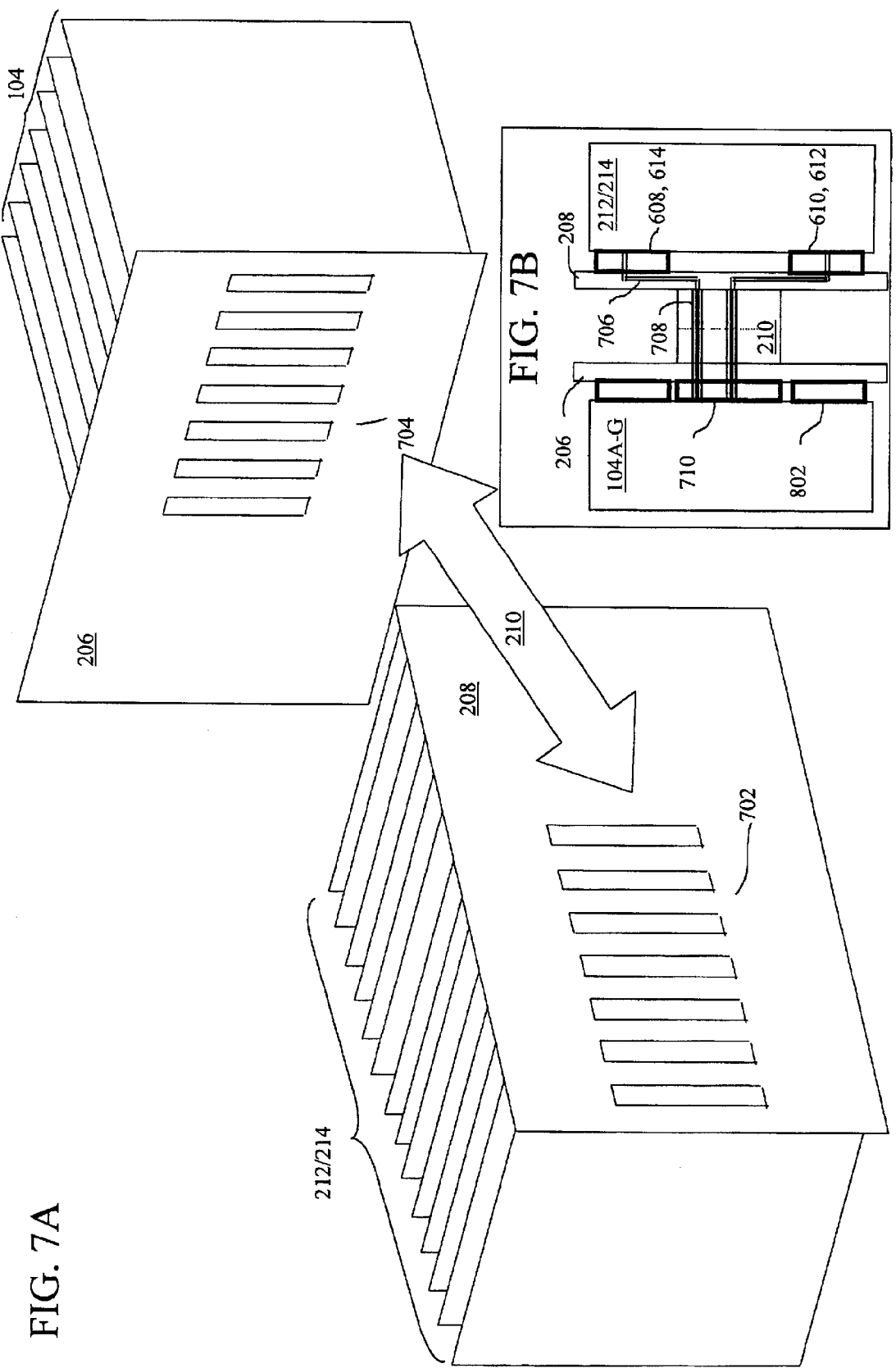
FIGS. 7A–7B depict block diagrams showing the interconnections of the backplanes of FIGS. 1 and 2.

FIG. 3 further depicts a schematic diagram showing various interconnections of the computer system of FIGS. 1 and 2. Redundant power supply pairs 216A–G are coupled with their loads 104A–G via the dual backplane arrangement consisting of a system backplane 206 coupled with a power backplane 208 in a back to back arrangement. The system input power 302 (–48 Volts DC) is distributed to the redundant power supply sets 216A–G via a power distribution bus 402 on the power backplane 208. FIG. 4 shows a block diagram showing the system power 302 connections to the power supplies 212A, 212B, 214A, 214B in each redundant set 216A–G, as well as the connections 408 with each of the loads 104A–G. As was described above, the connections 408 are effected over the inter-backplane connectors 210, the pins of which pass through the system backplane 206 to the connectors which receive the loads 104A–G, thereby eliminating the need for traces on the system backplane 206 to effect the power connection (refer to FIG. 7). Further, each of the power supply boards 212A, 212B, 214A, 214B in the redundant set 216A–G are coupled together for the purposes of load sharing and monitoring each other's operating status, as will be described below. A System I/O bus 404 is provided to interconnect the power supply boards 212A, 212B, 214A, 214B with the Monitoring, Alarm and Peripheral Module ("MAPM") 304. In one embodiment, this system I/O bus 404 includes a bus which complies with the I²C interface bus standard, developed by Philips Semiconductors, located in Eindhoven, The Netherlands. The system I/O bus 4040 may also include other signals such as enable signals, as described below.

Figure 5:
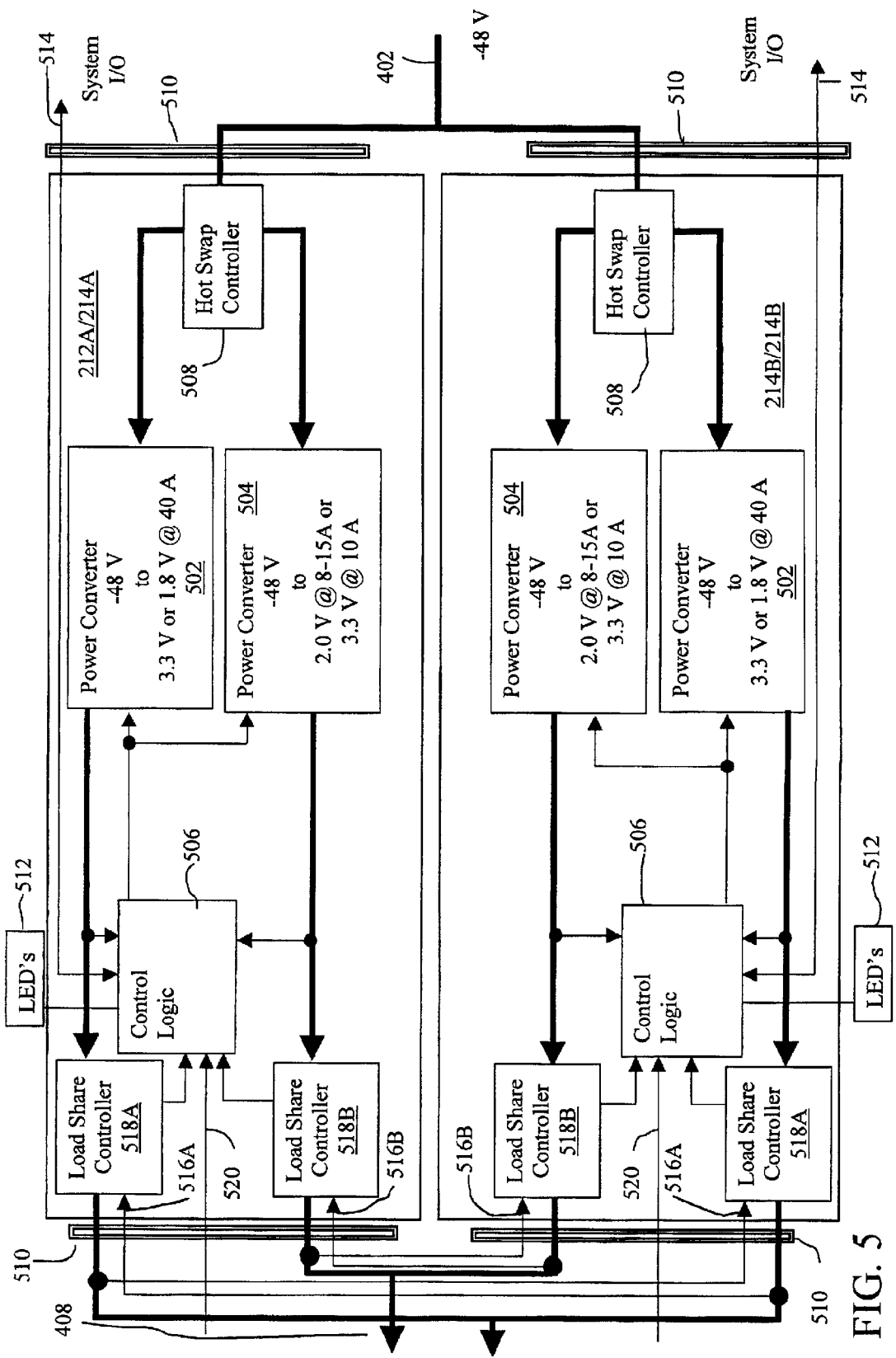
FIG. 5 depicts a block diagram of an exemplary set of power supplies for use with the embodiment of FIGS. 1 and 2.

FIG. 5 depicts a block diagram of an exemplary set 216A–G of identical power supplies 212, 214 for use with the embodiment of FIGS. 1 and 2. This set 216A–G may be of the 2.0 Volt supply type 212A, 212B or the 1.8 Volt supply type 214A, 214B. For a 2.0 Volt supply type 212A, 212B, one power converter 502 of each supply 212A, 212B converts the –48 Volt input to 3.3 Volts at 40 Amps and the other power converter 504 of each supply 212A, 212B converts the –48 Volt input to 2.0 Volts at 8–15 Amps. For a 1.8 Volt supply type 214A, 214B, one power converter 502 of each supply 214A, 214B converts the –48 Volt input to 1.8 Volts at 40 Amps and the other power converter 504 of each supply 214A, 214B converts the –48 Volt input to 3.3 Volts at 10 Amps.

Each power supply board 212A, 212B, 214A, 214B is physically constructed on a printed circuit board having a full card, or 6U, height where 1U is approximately 1.75 inches. Using a 6U card height provides enough physical area for the components as well as ensures that there is enough surface area for efficient air flow and cooling. In an alternative embodiment, each power supply board 212A, 212B, 214A, 214B is physically constructed on a half-height or 3U height board wherein the redundant power supply boards 212A, 212B, 214A, 214B are arranged in a stacked relationship, one on top of the other. All input and output connections to the power supply board 212A, 212B, 214A, 214B are via the connectors 510 to the power backplane 208. Therefore, removing or inserting the power supply board 212A, 212B, 214A, 214B automatically connects or disconnects both the input and output power connections 402, 408 simultaneously, as well as other system signals 514.

Each power supply board 212A, 212B, 214A, 214B includes two power converters 502, 504, control logic 506, a hot swap controller 508 and load sharing controllers 518A, 518B. Further, connectors 510 provide the interconnection of the power supply board 212A, 212B, 214A, 214B to the power backplane 208. Each power converter 502, 504 receives the –48 Volt system input from the power backplane 208 distribution bus 402 via the connectors 510. In the 2.0 Volt supply 212, power converter 502 converts the –48 Volt input into 3.3 Volts @ 40 Amps while the other power converter 504 converts the –48 Volts input into 2.0 Volts @ 8–15 Amps. In one embodiment of the 2.0 Volt supply 212, the power converter 502 is an Ericsson PKJ 4110 DC/DC converter and the power converter 504 is an Ericsson PKM 4319 DC/DC converter, both manufactured by Ericsson Microelectronics, located in Richardson, Tex. In the 1.8 Volt supply 214, power converter 502 converts the –48 Volt input into 1.8 Volts @ 40 Amps while the other power converter 504 converts the –48 Volts input into 3.3 Volts @ 10 Amps. In one embodiment of the 1.8 Volt supply 214, the power converter 502 is an Ericsson PKJ 4718 DC/DC converter and the power converter 504 is an Ericsson PKM 4510 DC/DC converter, both manufactured by Ericsson Microelectronics, located in Richardson, Tex.

The outputs of the power converters 502, 504 of each power supply 212A, 214A are coupled with the load sharing controllers 518A, 518B. The outputs of the load sharing controllers 518A, 518B are coupled, via connectors 510 and the power backplane 208, together with their counterpart outputs from the second power supply board 212B, 214B in a load sharing arrangement. As was described, the power backplane 208 further effects the connection of the power supply 212A, 214A outputs with the corresponding load 104A–G via the backplane-backplane connectors 210. The load sharing controllers 518A, 518B further provide a sense input 516A, 516B which is coupled, via connectors 510 and the power backplane 208, together with the power outputs from the second power supply board 212B, 214B. The sense input 516A, 516B is used to measure the amount of power being delivered by the other supply 212b, 214B, described in more detail below.

The load sharing controllers 518A, 518B balance the power delivered by the power supply 212A, 214A with the power delivered by the counterpart power supply 212B, 214B. Under normal operating conditions, where both power supplies 212A, 214A, 212B, 214B are operating normally, the load controllers 518A, 518B will balance the delivered power equally so that each power supply 212A, 214A, 212B, 214B is delivering approximately 50% of the power required by the load 104A–G. The load sharing controllers 518A, 518B attempt to maintain a steady state equilibrium. Any rise or drop, or other fluctuation, in delivered power by one power supply 212A, 214A, will result in compensation by the other supply 212B, 214B and vice versa, in order to maintain the total delivered power. In one embodiment, the load sharing controllers 518A, 518B include a Linear Technology LTC4350 load share controller manufactured by Linear Technology, located in Milpitas, Calif. In one embodiment, the load sharing controllers 518A, 518B are free to oscillate thereby always trying to achieve balance at approximately 50% power delivered. In an alternate embodiment, the load sharing controllers 518A, 518B of one power supply 212A, 214A may be set at a maximum power delivery limit while the load sharing controllers 518A, 518B of the other supply 212B, 214B are free to deliver what ever power is not supplied by first power supply 212A, 214A. For example, one power supply 212A, 214A may be limited to deliver only 25% of the required power with the other power supply 212B, 214B delivering 75% (by automatically balancing the deficit caused by the first supply 212A, 214A). In yet another alternate embodiment, maximum power delivery limits may be set for both power supplies 212A, 214A, 212B, 214B to limit the amount of oscillation in the load share controllers 518A, 518B as they attempt to balance the combined delivered power. For example, each power supply 212A, 214A, 212B, 214B may be limited to 55% wherein no matter what the other supply 212B, 214B is providing, the first supply 212A, 214A will provide no more than 55% of the total power. In this way, large oscillation swings are prevented as the power supplies 212A, 214A, 212B, 214B attempt to reach equilibrium. As will be described below, these limits may be combined with the over-current protection logic which prevents the combined power delivery from exceeding 100% of the power required by the load or 100% of any one power supply's 212A, 214A capacity when the other supply 212B, 214B is still operating.

The control logic 506 is coupled with the power converters 502, 504, load sharing controllers 518A, 518B and the LED's 512. Further, the control logic 506 receives inputs from, and transmits status on to, the system I/O bus 404 via the system I/O bus interface 514. In addition, the control logic 506 receives a load status input 520 indicating that the load 104A–G is present and functioning properly. As will be described in more detail below, the control logic 506 controls operation of the power supply 212A, 214A, detects faults and reports status to the external LED indicators 512 and the central system MAPM 304. Faults detected by the control logic 506 include over current limit, under voltage limit, thermal fault, load fault, loading short circuit, and input power fault. It will be appreciated that other faults may also be detected by the control logic 506. In response to detecting a fault, the control logic 506 shuts off the power supply 212A, 214B, as will be described in more detail below. Status provided to the LED indicators 512 and the MAPM 304 includes the temperature of the power supply 212A, 214A as well as the present output voltage and current levels. This data allows the MAPM 304 to monitor for gradual degradation in power supply 212A, 214A performance over time and shut down the power supply 212A, 214A well before a catastrophic event can occur. As will be discussed below, the on-board fault detection of the power supply 212A, 214A provides protection from rapid/immediate degradation/failures for which the MAPM 304 may not have time to act to prevent catastrophic results.

The hot swap controller 508 is coupled between the system power inputs 402 and the power converters 502, 504 to enable the power supply boards 212A, 214A, 212B, 214B to be inserted or removed at any time during system operation without impeding system performance or damaging itself or other components. The hot swap controller 508 monitors the power inputs 402 to detect when system input power is applied or removed to the power supply board 212A, 214A, 212B, 214B. The hot swap controller 508 ensures that the system input power has reached a stable steady state before allowing it through to the power converters 502, 504. Further, the hot swap controller 508 detects short circuits in the system input power and prevents a current rush into the power converters 502, 504. Where a fault is detected on the system power inputs, the hot swap controller 508 will not connect the power converters 502, 504 with the input power to prevent component damage. In one embodiment, the hot swap controller 508 includes a Linear Technology LT1640 Hot Swap Controller manufactured by Linear Technology, located in Milpitas, Calif.

Figure 15:
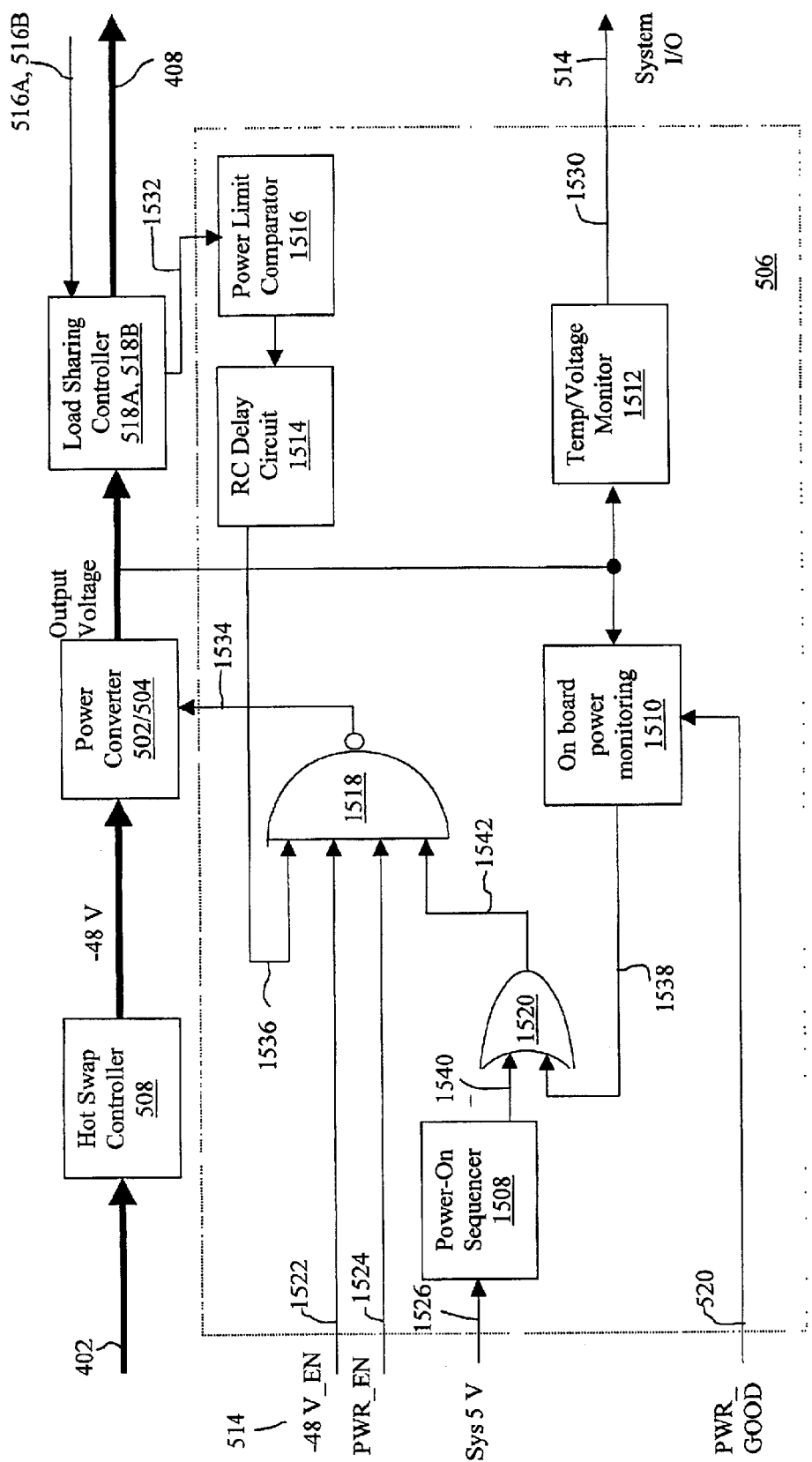
FIG. 15 depicts a more detailed block diagram of the power supplies shown in FIG. 5.

FIG. 15 depicts a more detailed logical diagram of the power supply boards 212A, 214A of FIG. 5 with respect to one of the two power converters 502, 504 on the power supply board 212A, 214A. It will be appreciated that similar circuitry is used for the other power converter 502, 504 on the board 212A, 214A or all, or portions, of the circuitry may be shared between the power converters 502, 504. The control logic 506 includes both discrete and integrated components. In one embodiment, these components utilize TTL level signals and logic although other forms of logic and logic signaling may also be used.

The control logic 506 includes inputs for the system I/O signals 514, including a system power enable signal (labeled "PWR_EN") 1524, a hot swap complete signal (labeled "−48V_EN") and a system low power input (labeled "SYS_5V") 1526. In one embodiment, the system power enable signal 1524 and hot swap complete signal 1522 are tied together. In an alternate embodiment, the hot swap complete signal 1522 is generated by the hot swap controller 508 and indicates that the hot swap controller 508 has reached steady state and is providing system power to the power converter 502, 504. The system low power input 1526 provides power to all of the control logic 506 and other supporting low power components of the power supply 212A, 214A. In one embodiment, the system low power input 1526 provides a 5 Volt input. The control logic 506 further provides inputs for a load status (labeled "PWR_GOOD") 520 from the associated load 104A–G and an input to sense the present power output 1532 from the load sharing controller 518A, 518B. The control logic 506 further provides an output 1534 to enable the power converters 502, 504 as well as an output 1530 to the system I/O bus 514 to report status information. LED visual indicators (not shown), mounted on the power supply board 212A, 214A, so as to be visible from outside the system 102, are also connected at various points within the control logic 506 to reflect various operating parameters, conditions and faults. It will be appreciated, that LED visual indicators 512 may be connected at various circuit junctions throughout the power supply 212A, 214A and such placement is implementation dependent. In one embodiment, LED indicators 512 are provided to indicate that the power supply 212A, 214A has failed, the system power input is okay, that the power supply output is okay (from each power converter 502, 504), and that the system low power input 1526 is okay. Other indicators 512 may also be provided such as a trouble code indicator.

The control logic 506 further includes a power-on sequencer 1508, a power limit comparator 1516, a temperature/voltage monitor 1512 and on-board power monitoring logic 1510. Enable logic 1518 is provided to generate an enable signal 1534 to the power converter 502, 504. The enable logic 1518 essentially performs a NAND function on its inputs to generate the enable signal output 1534. When all of the inputs to the enable logic 1518 are asserted, the enable signal 1534 is asserted low, thereby enabling the power converter 502, 504 to convert the input voltage to the output voltage. As will be described, if any of the inputs to the NAND logic 1518 are deasserted, then the enable signal 1534 will be deasserted (high) thereby deactivating the power converter 502, 504. The system power enable signal 1524 and hot swap complete signal 1522 are directly connected with 2 of the inputs of the enable logic 1518 and each signal must be asserted for the power converter 502, 504 to be enabled. As was described, these signals 1524, 1522 are generated centrally by the system 102 to all of the power supplies 212A, 214A, 212B, 214B. Alternately, as described, the hot swap complete signal 1522 may be generated by the hot swap controller 508.

The power limit comparator 1516 measures the current being output by the load sharing controller via the sense input 1532. As will be described, the power limit comparator 1516 compares the current being output with a pre-set power limit to determine if too much current is being output to the load 104A–G. This monitoring is in addition to the load balancing performed by the load sharing controllers 518A, 518B and serves to protect the load 104A–G from overload should the load sharing controllers 518A, 518B malfunction. For example, under normal operating conditions, the pre-set power limit is set to approximately 50%. Ensuring that neither power supply 212A, 214A, 212B, 214B in the power supply set 216A–G can provide more than 50%, +/− a defined tolerance, of the required power prevents the combined delivered power from exceeding 100% of the required power and overloading the load 104A–G or the connections thereto. If the power converter 502, 504 attempts to deliver more power, i.e. current, than the limit, the power limit comparator 1516 will shut off the power converter 502, 504, as will be described below.

The power limit comparator 1516 also determines when the pre-set power limit should change. Under normal operating conditions, the power limit comparator 1516, as will be described, prevents the power converter 502, 504 from delivering more than approximately 50% of its capacity, +/− a tolerance. However, should the other power supply board 212B, 214B fail, then the power converter 502, 504 should be allowed to deliver up to 100% of its capacity. The power limit comparator 1516 also receives the sense voltage 516A, 516B from the other power supply 212B, 214B. If the power limit comparator 1516 determines that the other power supply 212B, 214B has failed, such as by detecting that the other supply 212B, 214B is supplying no power or less power than a prescribed margin, then the power limit comparator 1516 will increase the pre-set power limit to 100% from 50% allowing the power converter 502, 504 to ramp up to full power if need be.

The power limit comparator 1516 is coupled with one of the inputs to the enable logic 1518 via an RC delay circuit 1514. Under normal operating conditions, the power limit controller 1516 asserts a power limit okay signal 1536 which, if all of the other enable logic 1518 inputs are asserted as well, enables the power converter 502, 504 to continue operating, via the NAND function. However, if the power output of the load sharing controller 518A, 518B increases above the pre-set power limit (50% when the other supply 212B, 214B is operating, and 100% if the other supply 212B, 214B has failed), then the power limit okay signal 1536 will be deasserted, causing the enable logic 1518 to disable the power converter 502, 504. The RC delay circuit 1514 delays the deassertion of the power limit okay signal 1536, and therefore inadvertent disabling of the power converter 502, 504, to account for the load sharing controller 518A, 518B supplying more current than the pre-set power limit upon initial power on wherein the companion power supply board 212B, 214B has not yet ramped up to its capacity yet, described in more detail below. In one embodiment, the power limit comparator 1516 includes two LM339 quad comparator circuits, manufactured by Linear Technology, located in Milpitas, Calif. and the RC delay circuit 1514 includes discrete components, such as resistors and capacitors, arranged to impart approximately a 10 millisecond delay.

In an alternate embodiment, power limit comparator 1516 computes the total power required by the load 104A–G and the present power being supplied by the other power supply 212B, 214B, and sets the pre-set power limit so that the total power delivered by the two power supplies 212A, 214A, 212B, 214B cannot exceed the power required by the load 104A–G. In this embodiment, the pre-set power limit may fluctuate wherein the control logic 506 of one power supply board 212A, 214A controls the power converters 502, 504 to deliver only enough power as is not being supplied by the other power supply board 212B, 214B to meet the needs of the load 104A–G.

The temperature/voltage monitor 1512 is coupled with the output of the power converter 502, 504. The temperature/voltage monitor 1512 monitors the output voltage level and the temperature on the power supply board 212A, 214A, via a temperature sensor (not shown) affixed to the power supply board 212, 214, and reports this data via the output 1530 to the system I/O bus interface 514 and onto the system I/O bus 404. In one embodiment, the temperature/voltage monitor includes a Philips PCF8591 I$^2$C 8-bit data acquisition device, manufactured by Philips Semiconductors, located in Eindhoven, The Netherlands. The system I/O bus 404 includes a communications bus compatible with the I$^2$C protocol, developed by Philips Semiconductors, located in Eindhoven, The Netherlands, and is connected with an I$^2$C master controller located on the MAPM 304. The system I/O bus 404 further includes other signals such as the system power enable signal 1524. As was described above, the MAPM 304 monitors the reported output voltage and temperature for gradual degradation or consistently out of range values which may indicate a fault is occurring or about to occur. The MAPM 304 may then act to shut down the power supply 212A, 214A well before the temperature and/or output voltage levels deviate enough to trigger the on board fault detection logic described below and well before catastrophic damage can occur.

The temperature/voltage monitor 1512 is further coupled with the on board power monitor 1510 which determines whether there is a thermal fault or the output voltage of the power converter 502, 504 is out of range. The on board power monitor 1510 is also coupled with the load status input 520. If the load 104A–G coupled with this particular power supply 212A, 214A is present and functioning correctly, the load status input 520 will be asserted. If the load 104A–G is removed from the system or otherwise fails, such as short circuits, the load status input 520 will be deasserted.

Under normal operating conditions, wherein the power converter 502, 504 output voltage and power supply 212A, 214B temperature are within tolerance and the load status input 520 is asserted, the on board power monitor 1510 will assert a status okay signal 1538 to the enable logic 1518. If the output voltage of the power converter 502, 504 or the temperature deviate from pre-set thresholds, or the load status input 520 is deasserted, indicating a load failure or removal, the status okay signal 1538 will be deasserted which will, as will be discussed below, deactivate the power converter 502, 504. Note that the on board power monitor 1510 acts to catch rapid/immediate deviations in the output voltage or temperature for which the MAPM 304 may not have time to act to shut down the power supply 212A, 214A as described above. The thresholds/margins, outside of which the on board power monitor 1510 will detect a fault, may be set accordingly to allow for normal/expected output voltage and temperature fluctuations.

The status okay signal 1538 is coupled with a logical OR gate 1520, the output 1542 of which is coupled with another input of the enable logic 1518. The power on sequencer 1508 is also coupled with the OR gate 1520. The power on sequencer 1508 is further coupled with the system low power input 1526. When the power on sequencer 1508 initially receives the system low power input 1526, it starts a count-down timer, during which the output 1540 to the OR gate 1520 is asserted. This keeps the input 1542 to the enable logic 1518 asserted. When the timer expires, the output 1540 is deasserted. In one embodiment, the timer is set to count down for approximately 500 milliseconds. This effectively prevents the on board power monitor 1510 from reporting a thermal fault or a fault due to a voltage output from the power converter being less than the required output level, which can occur during initial power on of the power converter 502, 504 while the output voltage is still ramping up to the requisite level. The timer of the power on sequencer 1508 is set long enough to allow the power converter 502, 504 to reach its desired output level before enabling the on board power monitor 1510 to report any detected faults. Alternatively, the timer is set for as long as necessary to establish that the power supply 212A, 212B has reached a stable state. In one embodiment, the timer value is hard wired. Alternatively, the timer may be programmable. In an alternate embodiment, the power on sequencer 1508 and timer may be replaced with a different signal which indicates that the system is powering up and that faults should be inhibited until the power supply 212A, 212B is completely powered up. In one embodiment, the on board power monitor 1510 includes an LM339 quad comparator device manufactured by Linear Technology, located in Milpitas, Calif. and the power on sequencer 1508 includes a Philips NE555N timing circuit manufactured by Philips Semiconductors, located in Eindhoven, The Netherlands.

FIGS. 12A–12D depict a schematic diagram of a physical design of a power supply circuit board for use with the embodiment of FIGS. 1 and 2. FIGS. 13A–13L depict a schematic diagram of a power supply 214A, 214B for use with the embodiment of FIGS. 1 and 2 for providing 1.8 Volts and 3.3 Volts. FIGS. 14A–14L depict a schematic diagram of a power supply 212A, 212B for use with the embodiment of FIGS. 1 and 2 for providing 3.3 Volts and 2.0 Volts. It will be appreciated that other suitable components, whether discrete or integrated, may also be used. Once constructed, the power supply circuit boards depicted in the schematics need to be connected to a −48 Volt input source 408, a 5 Volt input source 1526, an enable signal indicating the −48 Volt power is on (−48V_EN) 1514, a power enable signal (PWR_EN) 1524 and a power good signal (PWR_GOOD) 520. Further, the power supply board needs to be coupled with a second power supply board for load sharing and with a suitable load/circuit board.

Figure 6:
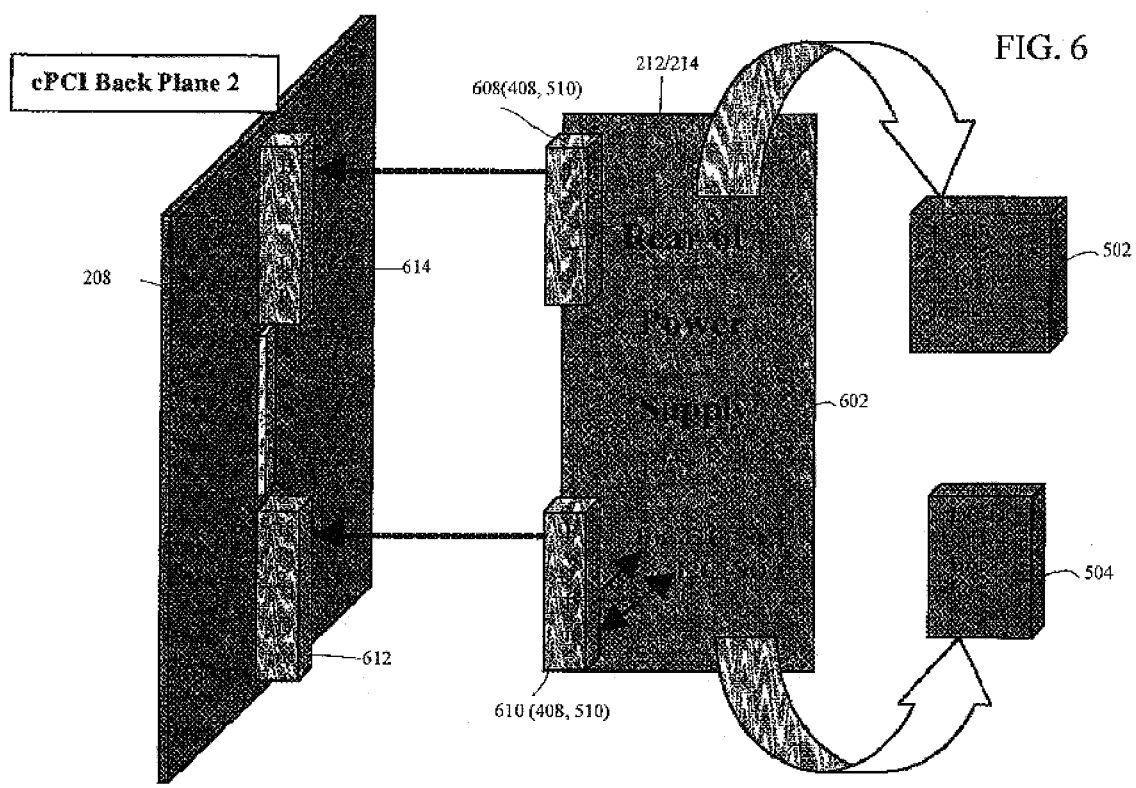
FIG. 6 depicts a diagram showing the connection between one of the power supplies of FIG. 5 and a backplane for use with the embodiment of FIGS. 1 and 2.

FIG. 6 depicts a diagram showing the connection between one of the power supplies of FIG. 5 and a power backplane 208 for use with the embodiment of FIGS. 1 and 2. Each power supply board 212/214 includes an upper backplane connector 608 and lower backplane connector 610, each of which mates with matching connectors 614, 612 on the power backplane 208. FIGS. 7A and 7B depict a block diagrams showing the interconnections 210 of the backplanes of FIGS. 1 and 2. In FIG. 7A, connectors 702 on the power backplane 208 mate with matching connectors 704 on the system backplane 206. FIG. 7B depicts an exemplary diagram showing one path of distribution wherein the power is distributed from the power supply 212/214 through the power backplane 218, via a distribution bus 706 to the associated inter-backplane connector 210 pins 708 which carry the power through the system backplane 206 directly to the inputs 710 of the load 104A–G.

Figure 8:
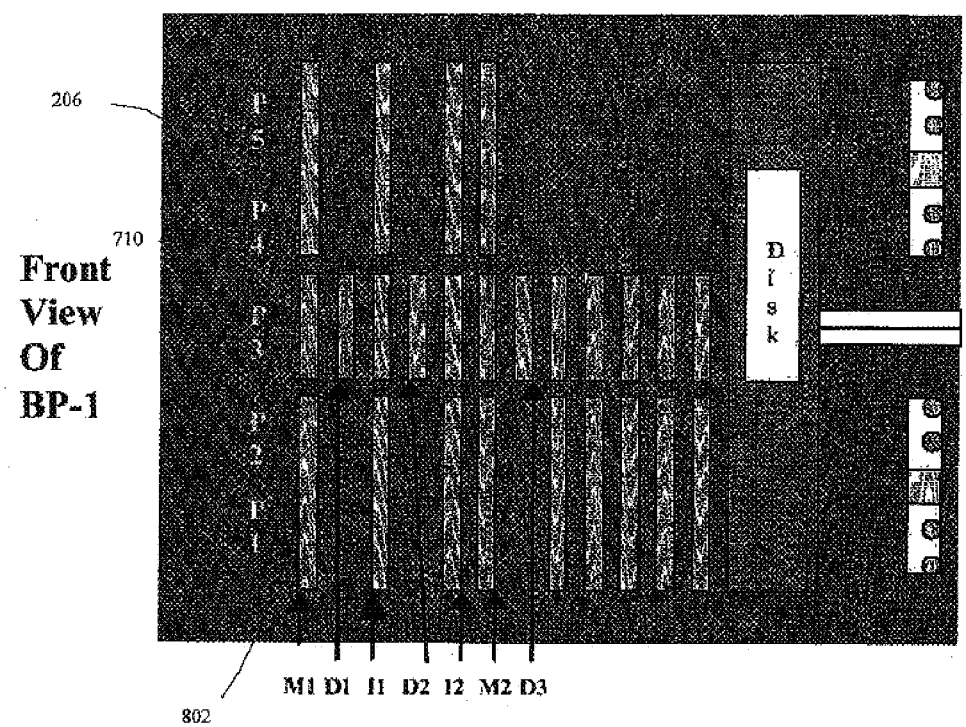
FIG. 8 depicts a front view of a circuit board backplane for use with the embodiment of FIGS. 1 and 2.

FIG. 8 depicts a front view of a system backplane for use with the embodiment of FIGS. 1 and 2. The circuit boards 104A–G as well as other components plug into the system backplane 206 via the connectors 802.

Figure 9:
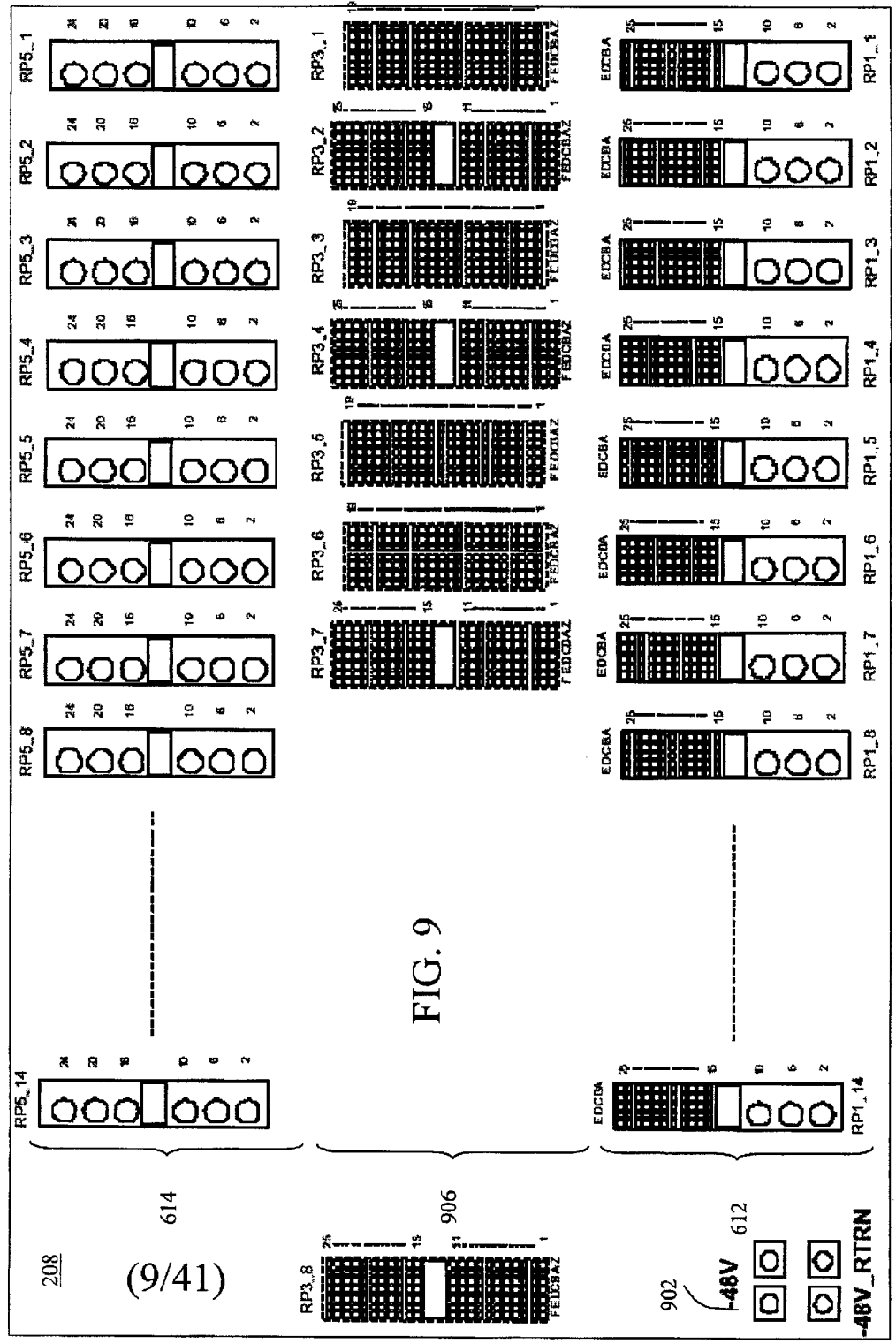
FIG. 9 depicts a schematic diagram of the front view of a power backplane for use with the embodiment of FIGS. 1 and 2.

FIG. 9 depicts a schematic diagram of the front view of a power backplane 208 for use with the embodiment of FIGS. 1 and 2. As was described in FIG. 6, the power backplane 208 provides upper and lower connectors 614, 612 which receive mating connectors 608, 610 on the power supply boards 212, 214. In addition, connectors 902 for the system input power to the power backplane 208 power distribution bus 408 are provided. FIG. 9 also shows the mounting positions 906 of the connectors 702 which interconnect the power backplane 208 to the system backplane 206. In one embodiment, the upper connectors 614 are Type L connectors and the lower connectors 612 are Type M connectors, both manufactured by Erni Group, Erni Components, Inc., located in Chester Va.

Figure 10:
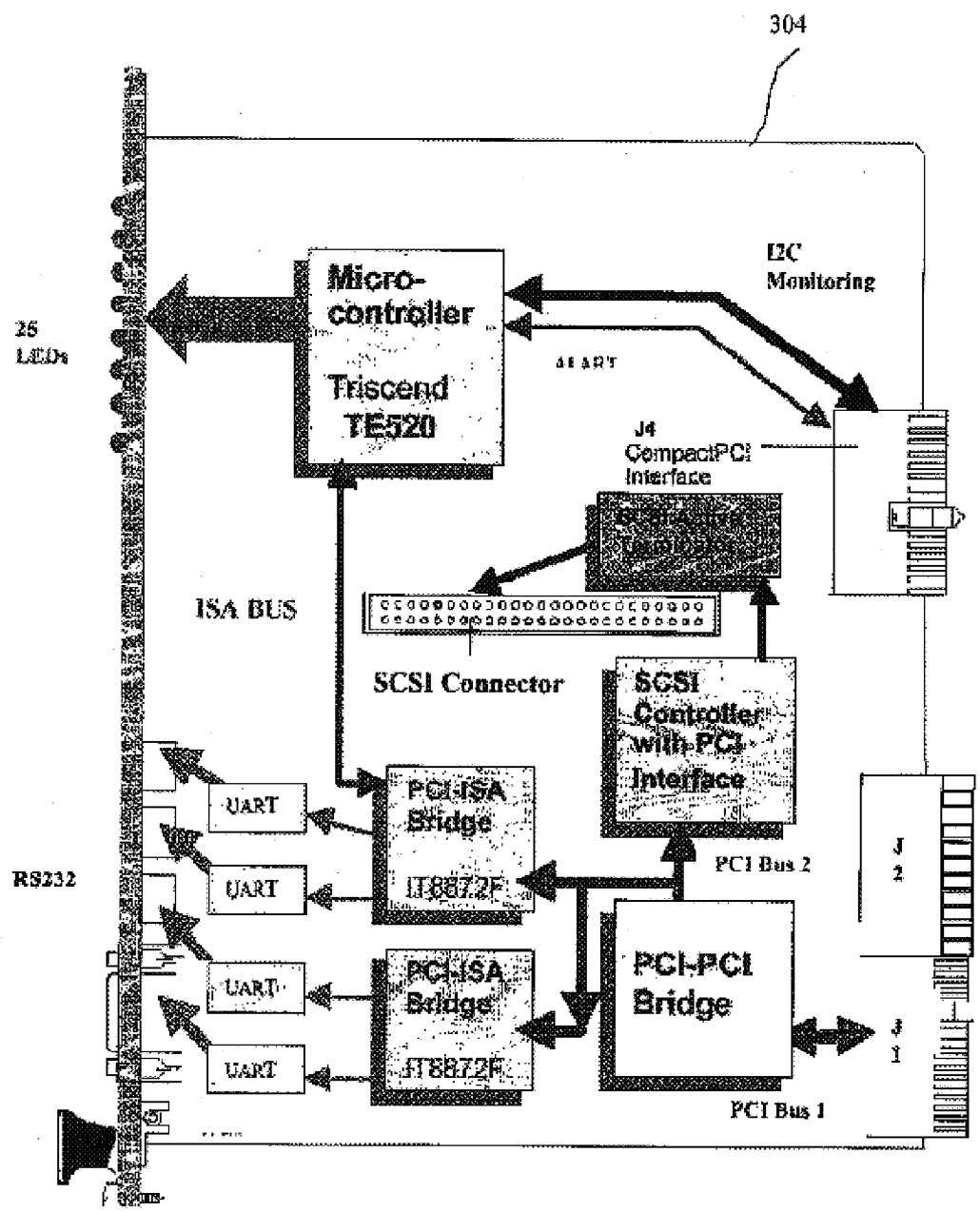
FIG. 10 depicts a block diagram of an exemplary Monitoring, Alarm and Peripheral Module for use with the embodiment of FIGS. 1 and 2.
Figure 11:
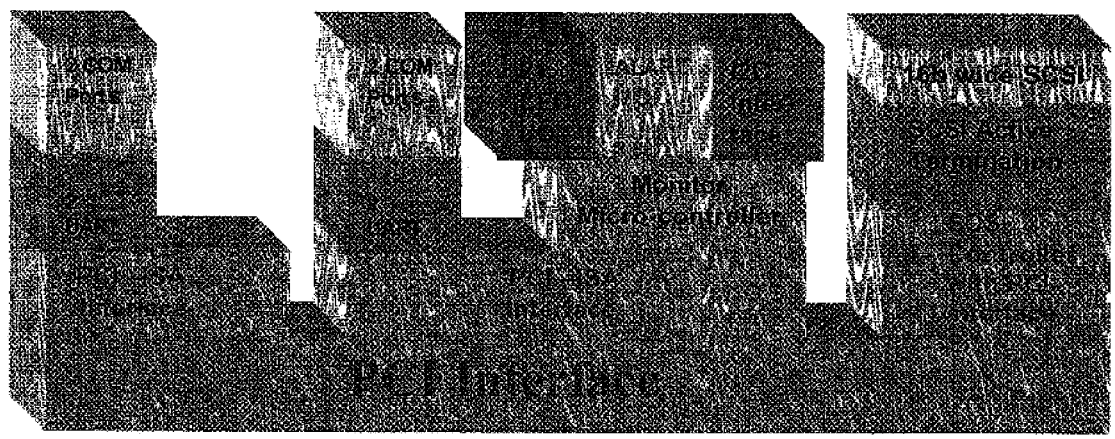
FIG. 11 depicts a block diagram showing the architecture of the Monitoring, Alarm and Peripheral Module of FIG. 10.
Figure 12A:
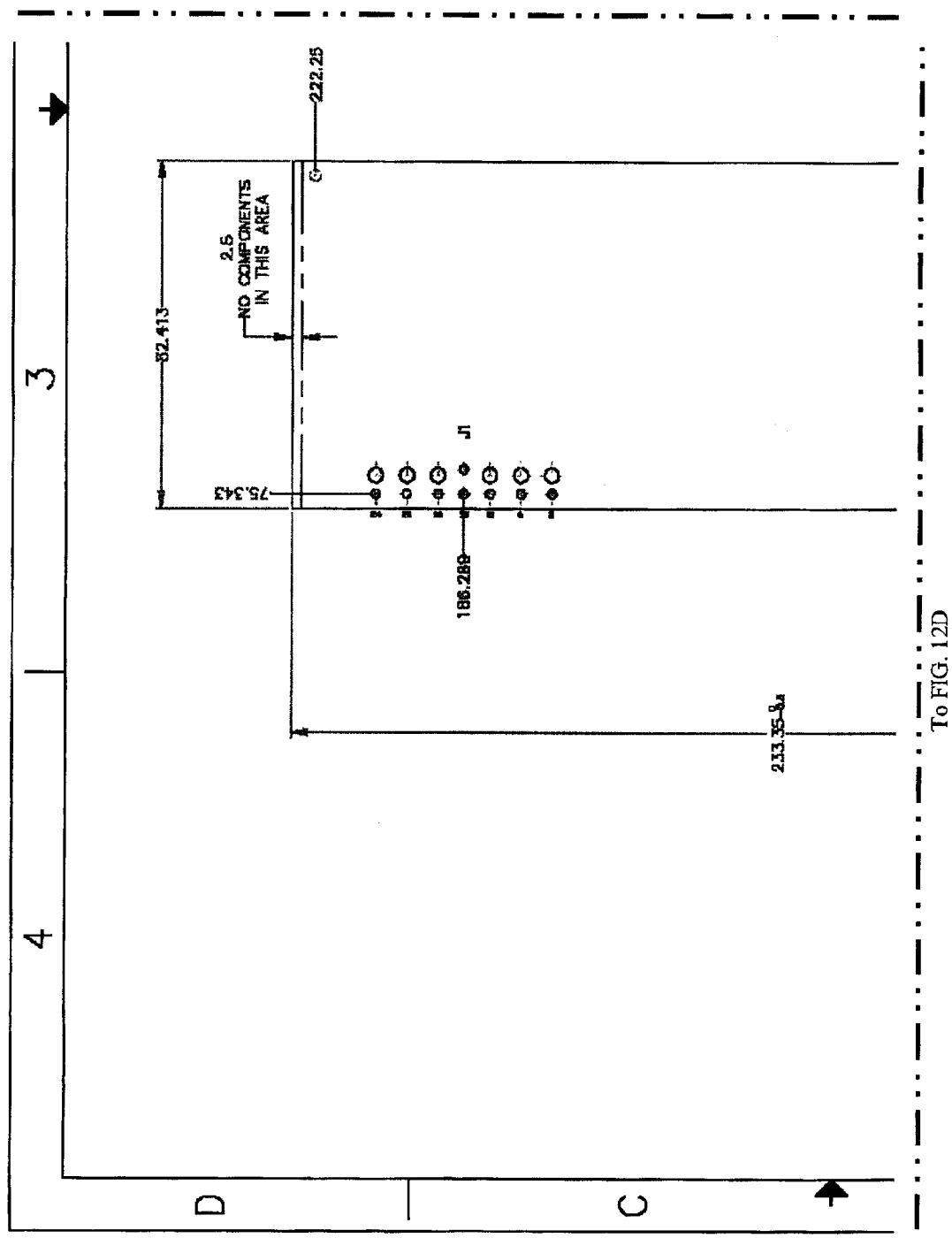
Figure 13A:
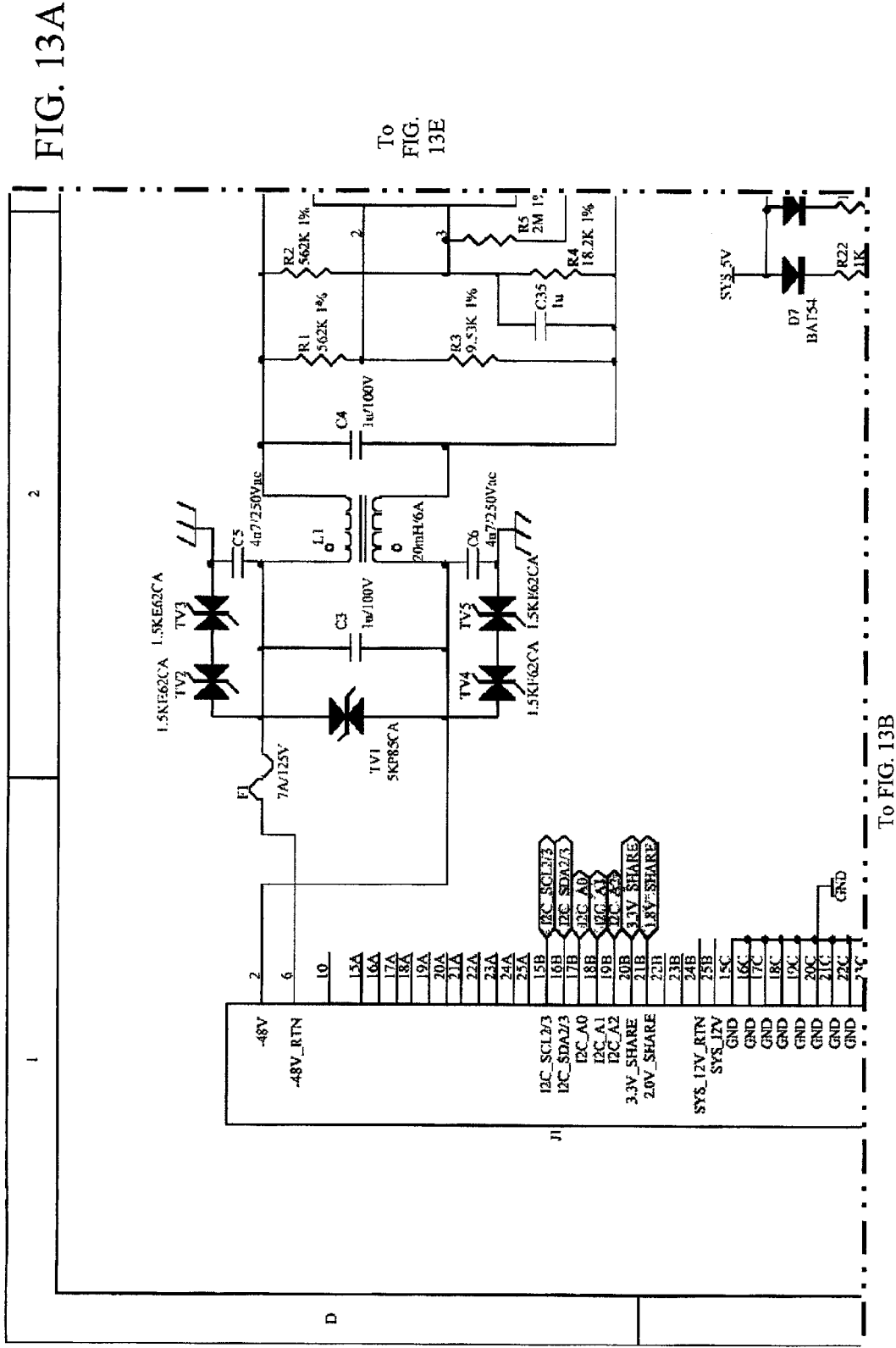
FIGS. 13A–13L depict a schematic diagram of a power supply for use with the embodiment of FIGS. 1 and 2 for providing 1.8 Volts and 3.3 Volts.
Figure 13B:
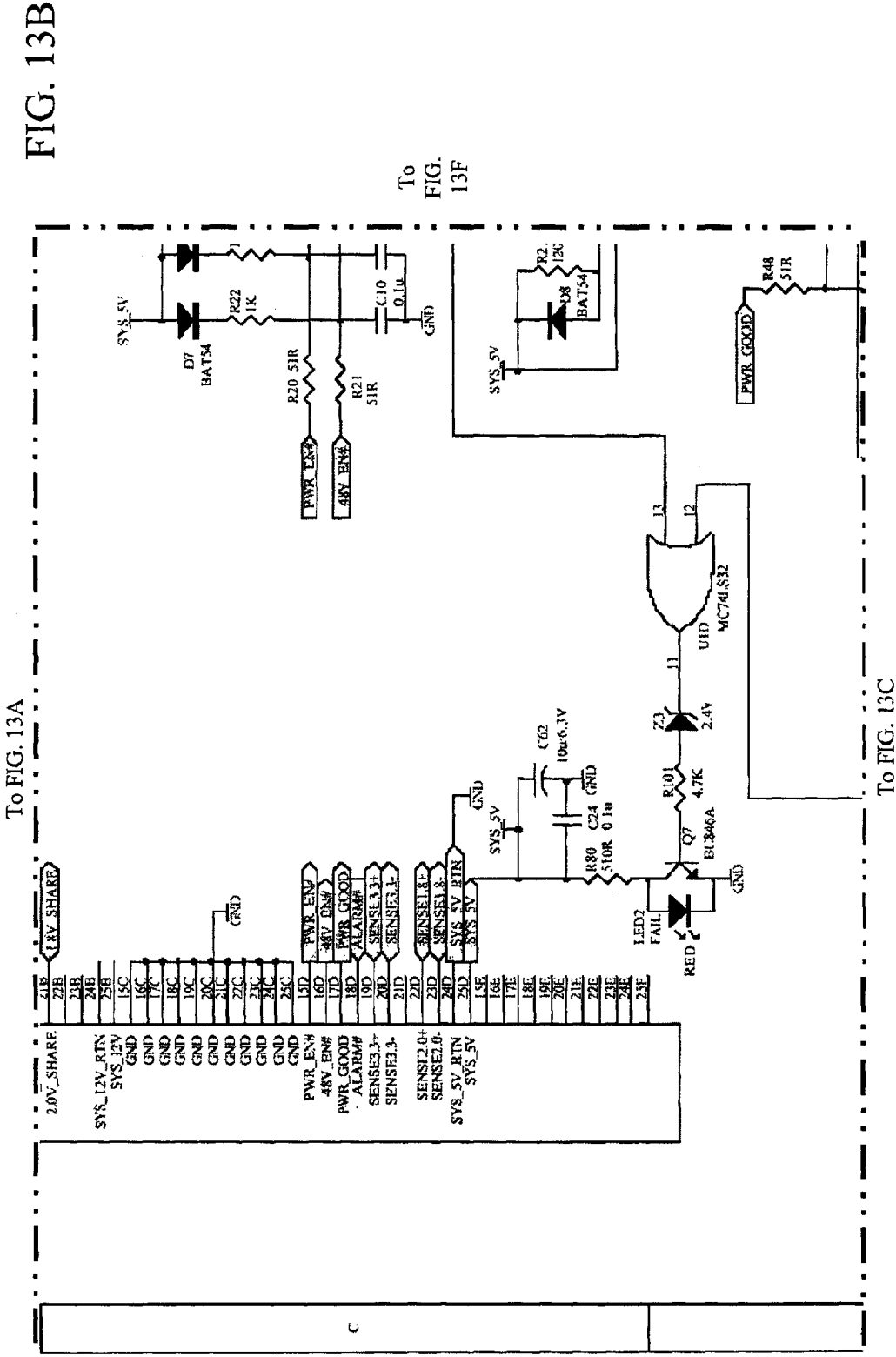
Figure 13C:
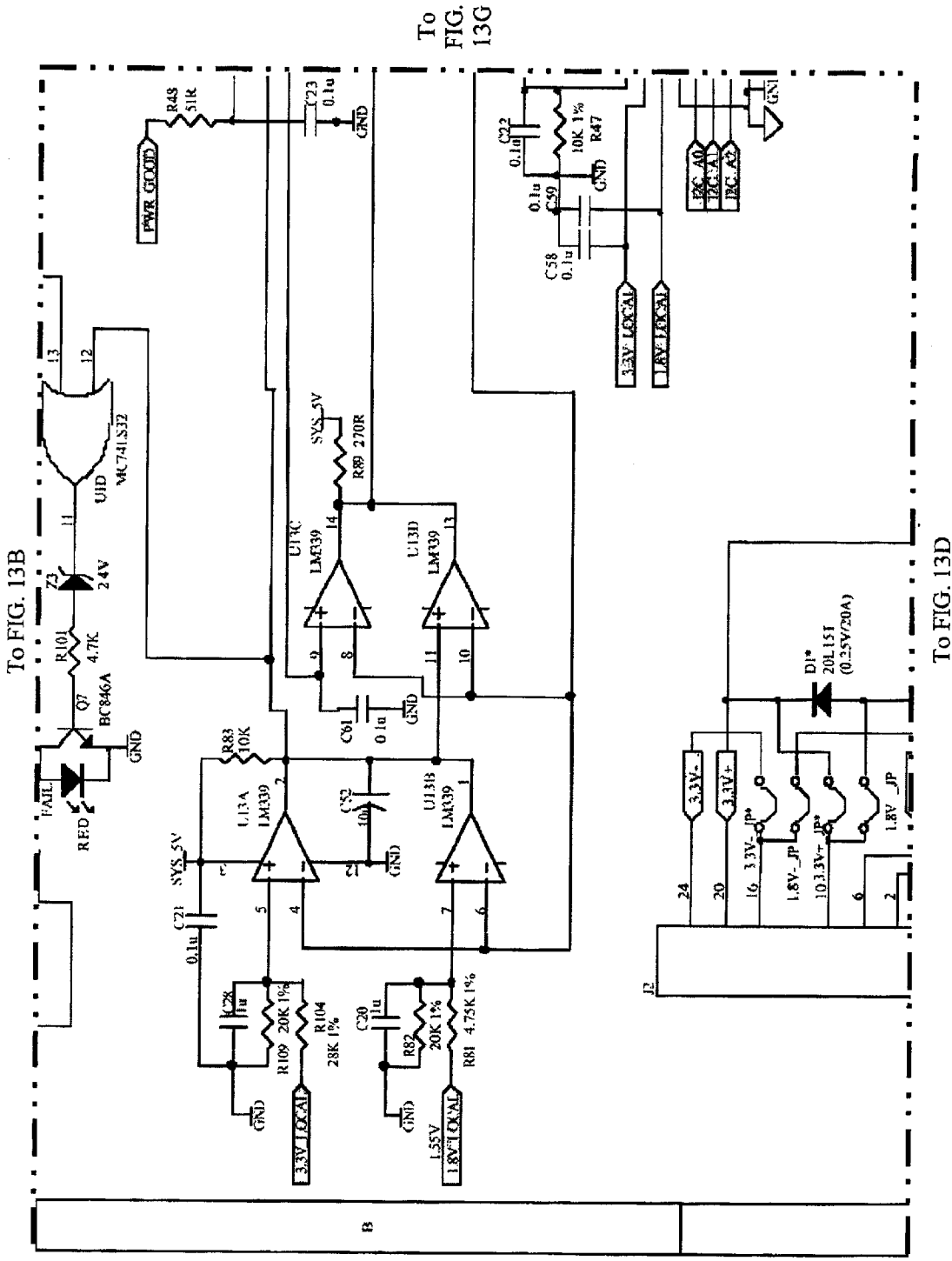
Figure 13D:
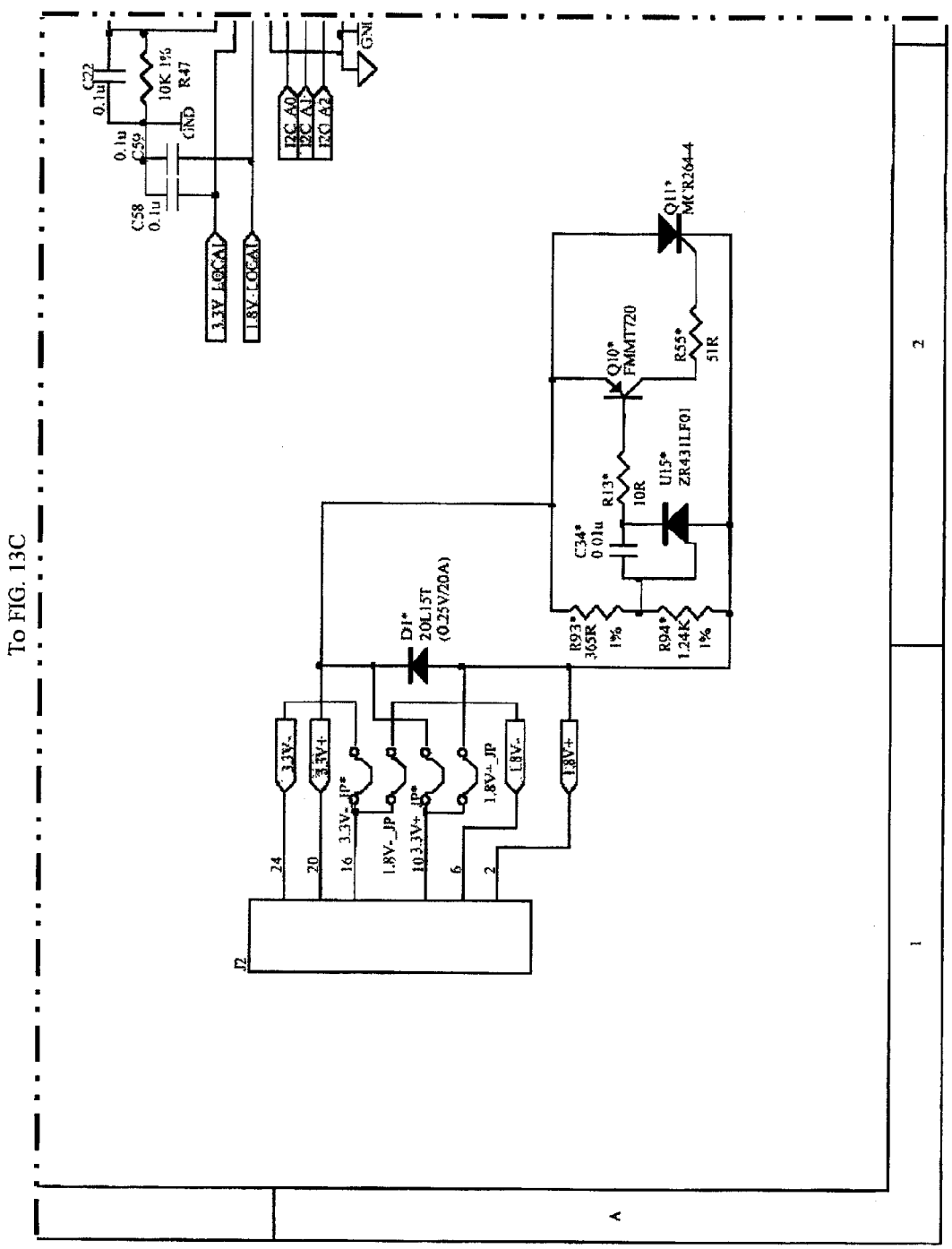
Figure 13E:
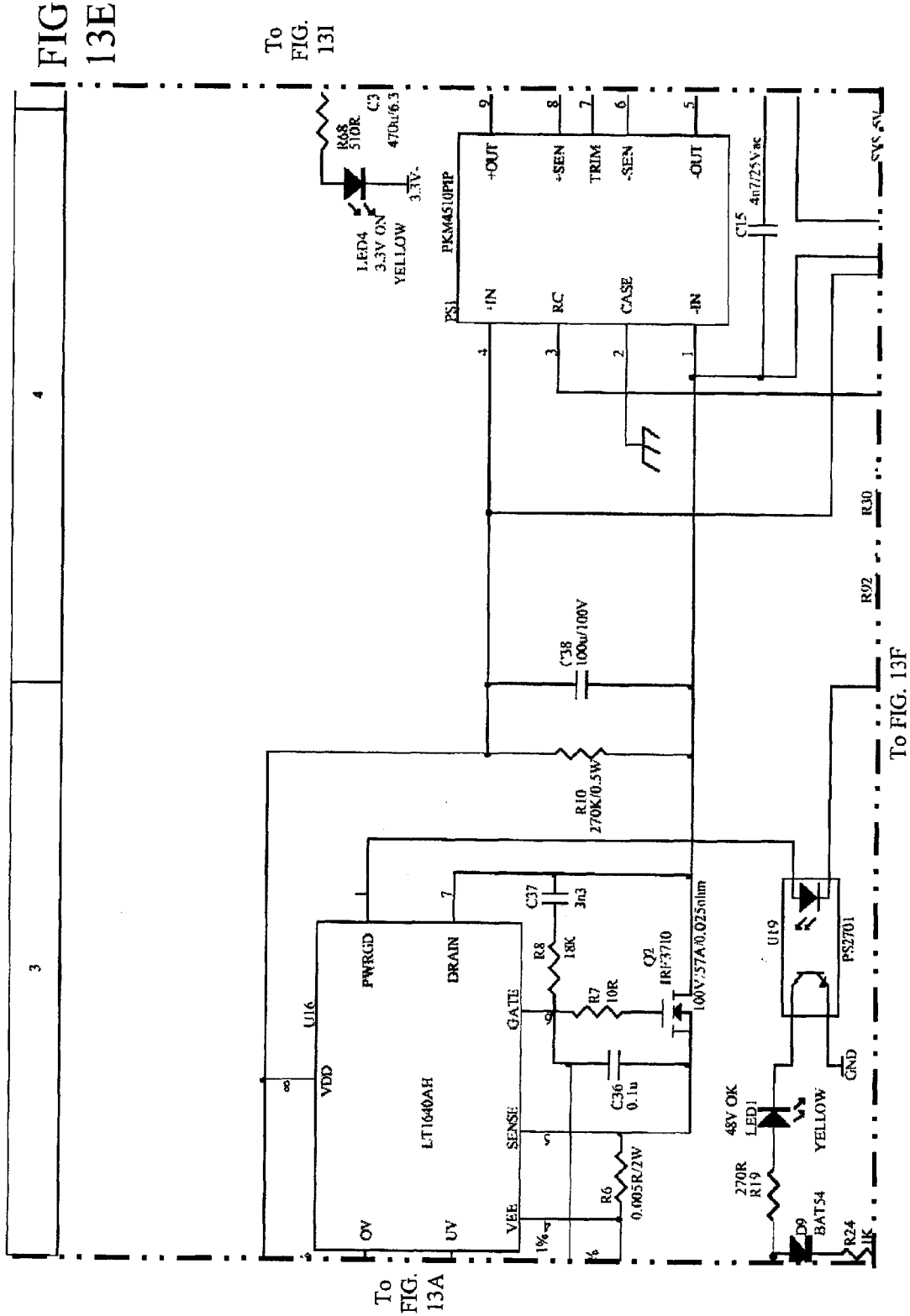
Figure 13F:
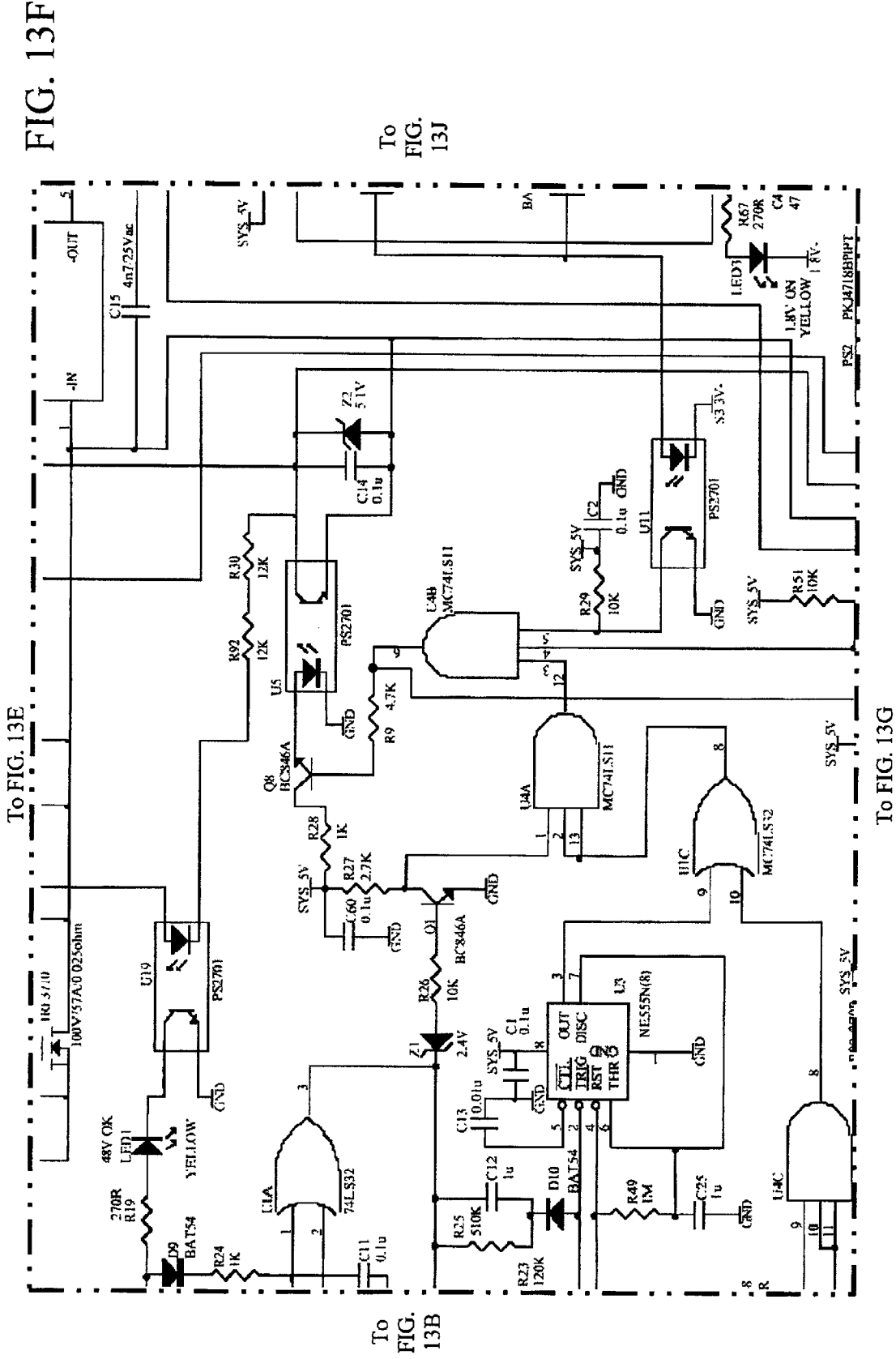
Figure 13G:
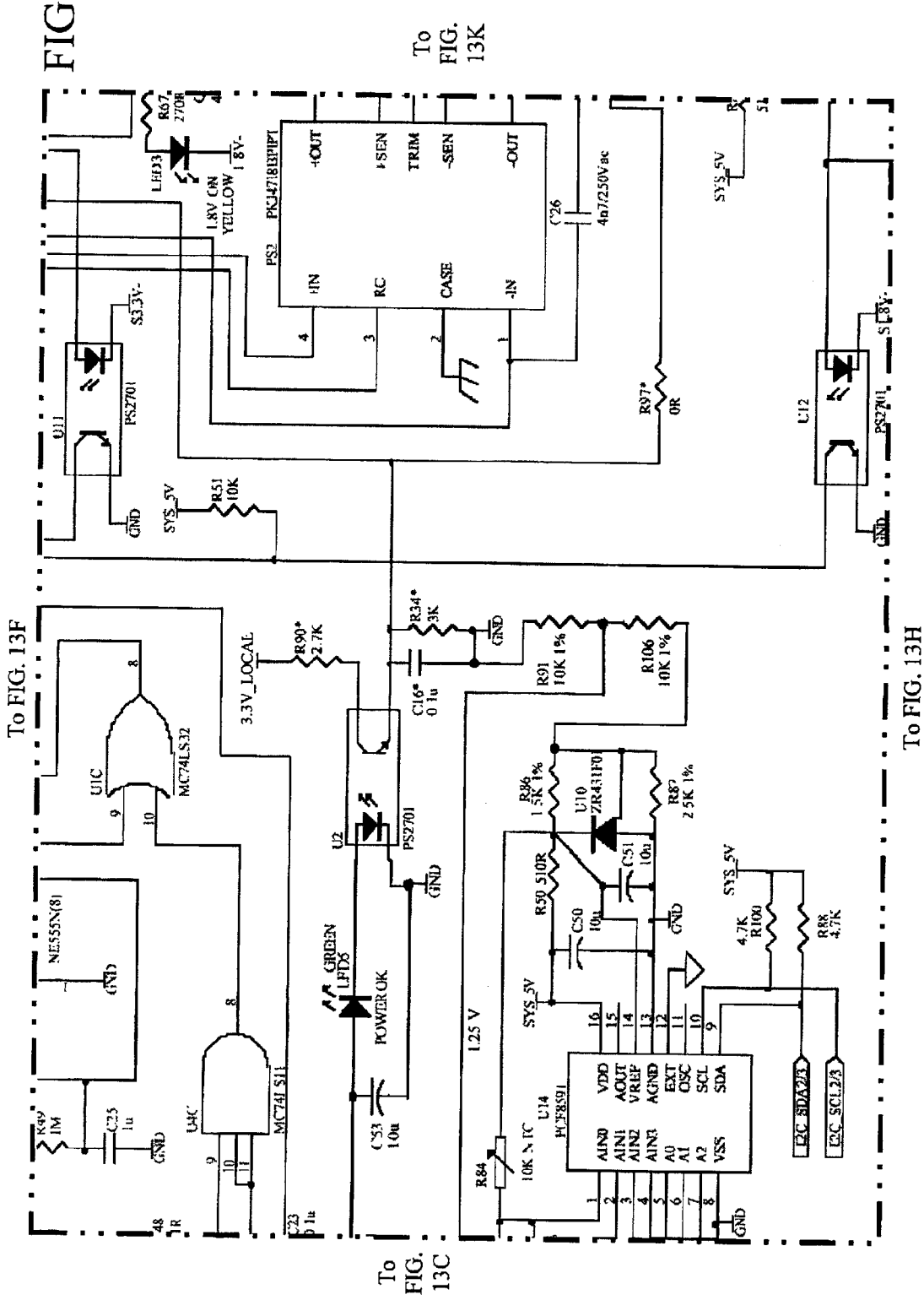
Figure 13H:
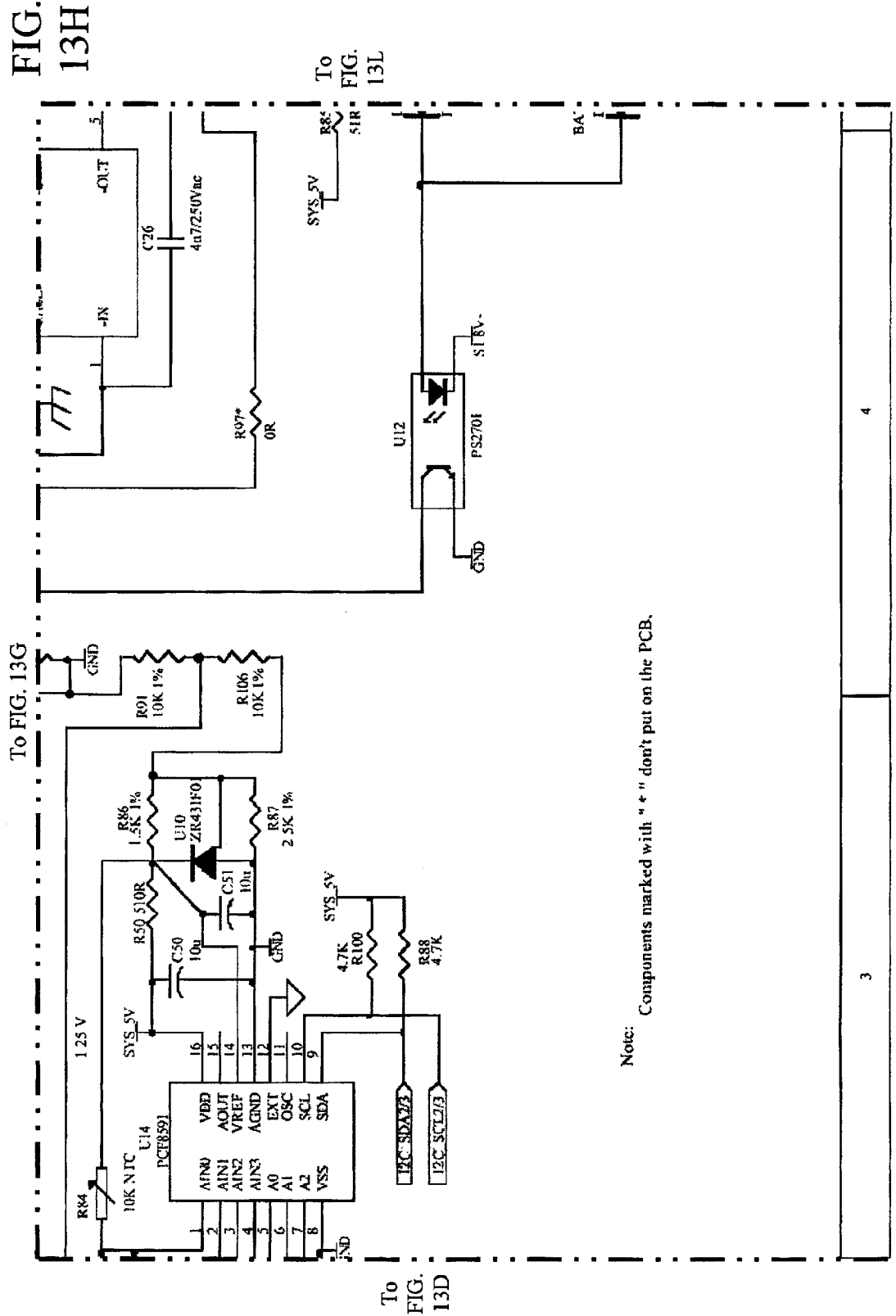
Figure 13I:
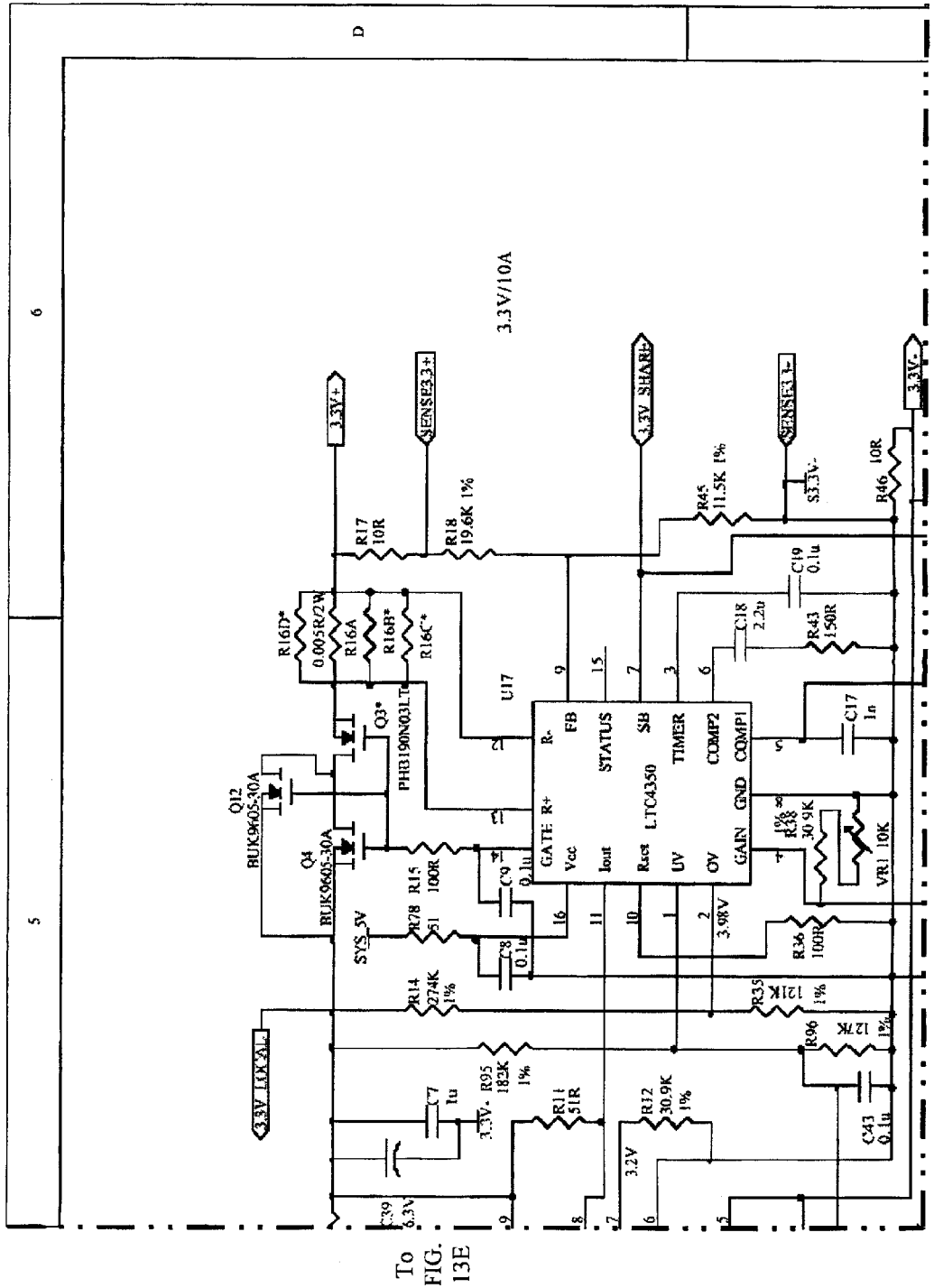
Figure 13J:
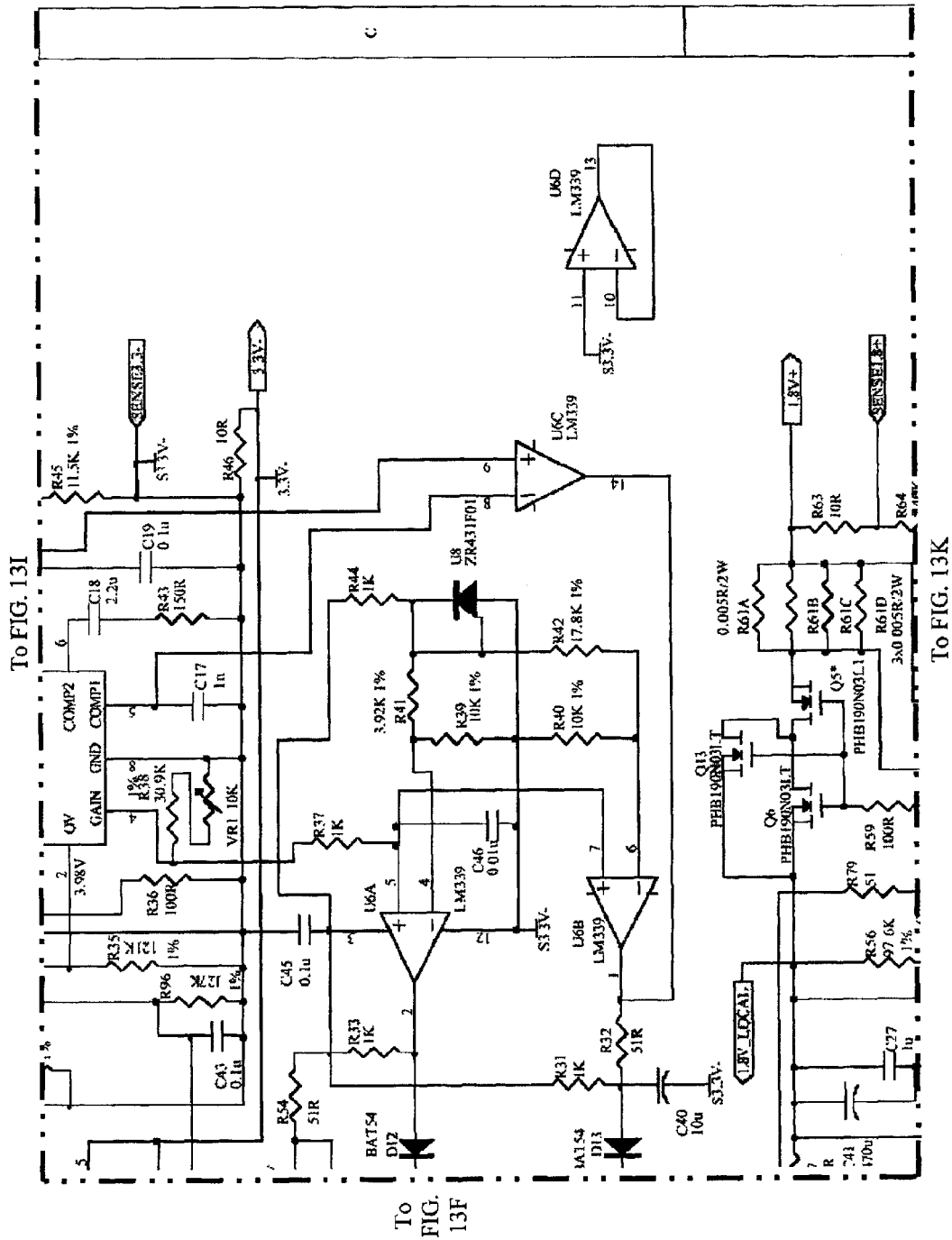
Figure 13K:
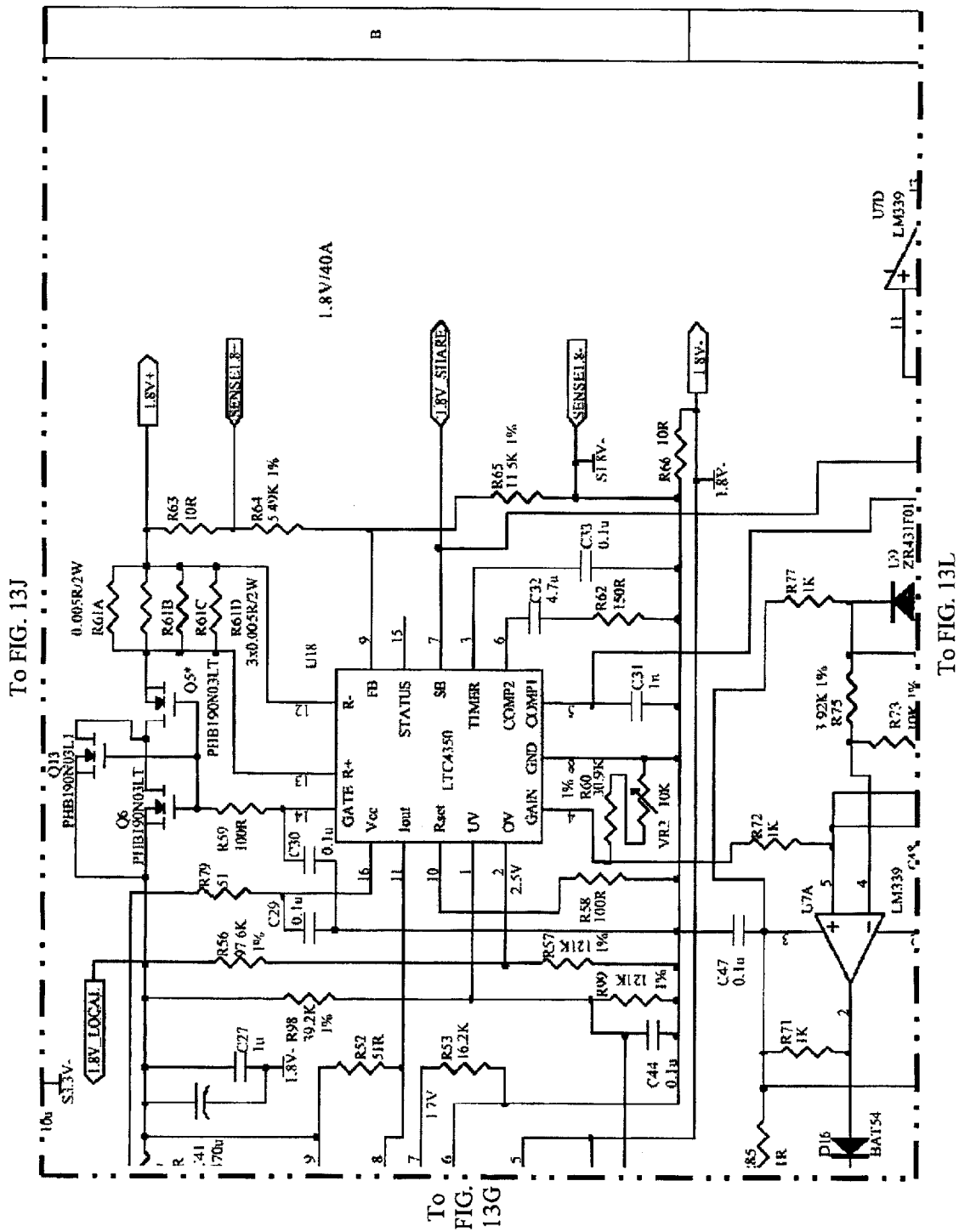
Figure 13L:
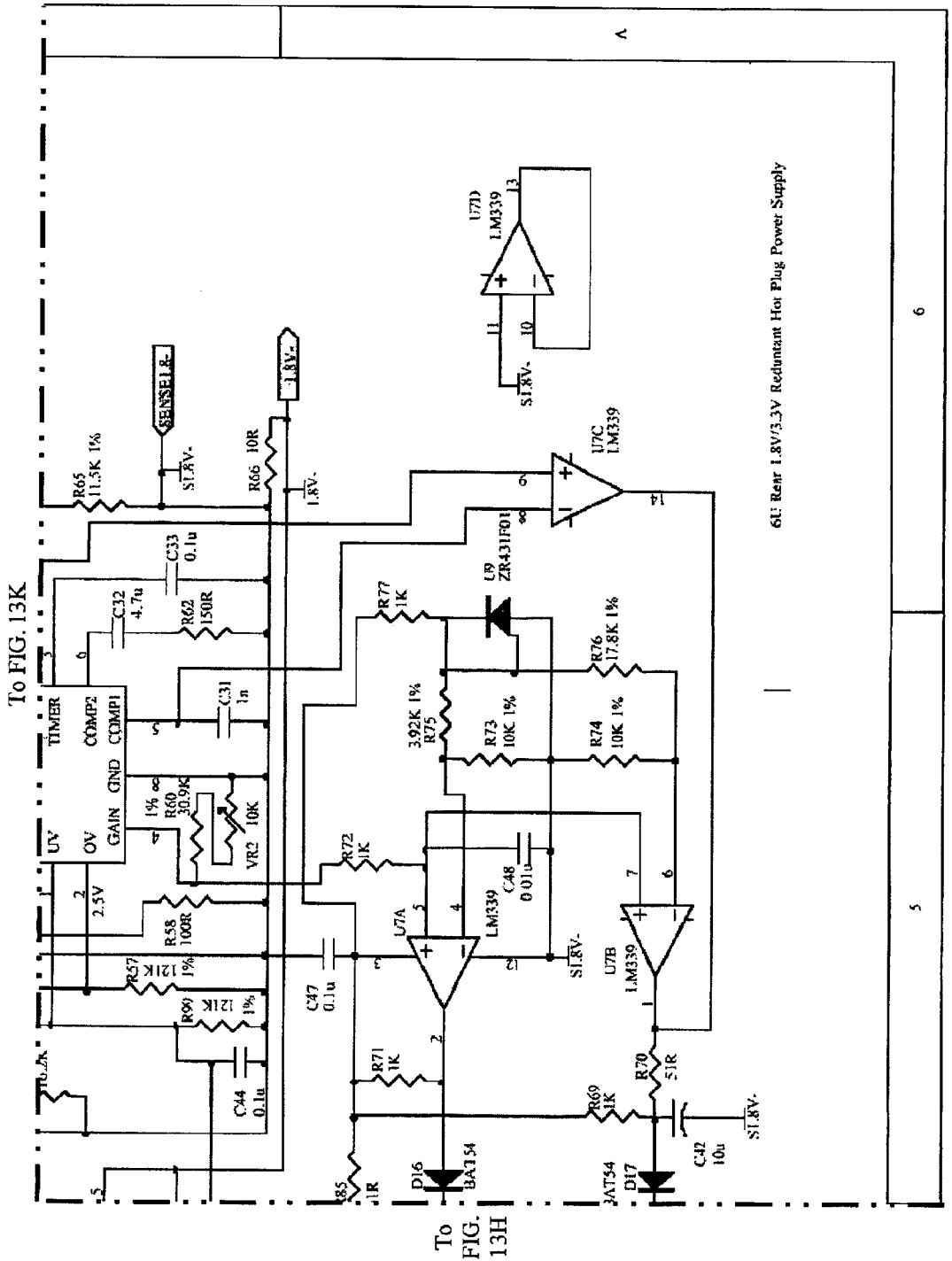
Figure 14A:
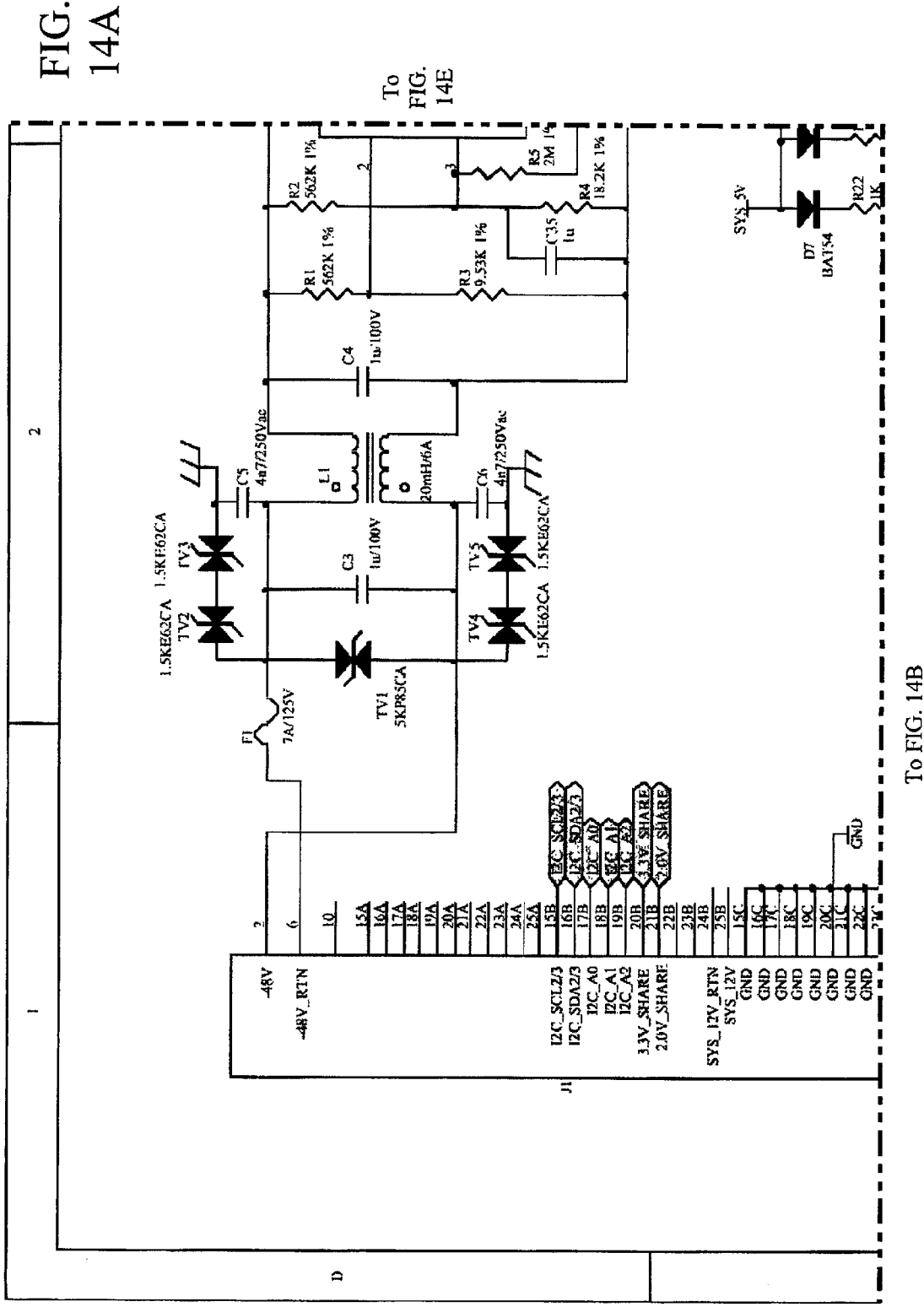
FIGS. 14A–14L depict a schematic diagram of a power supply for use with the embodiment of FIGS. 1 and 2 for providing 3.3 Volts and 2.0 Volts.
Figure 14B:
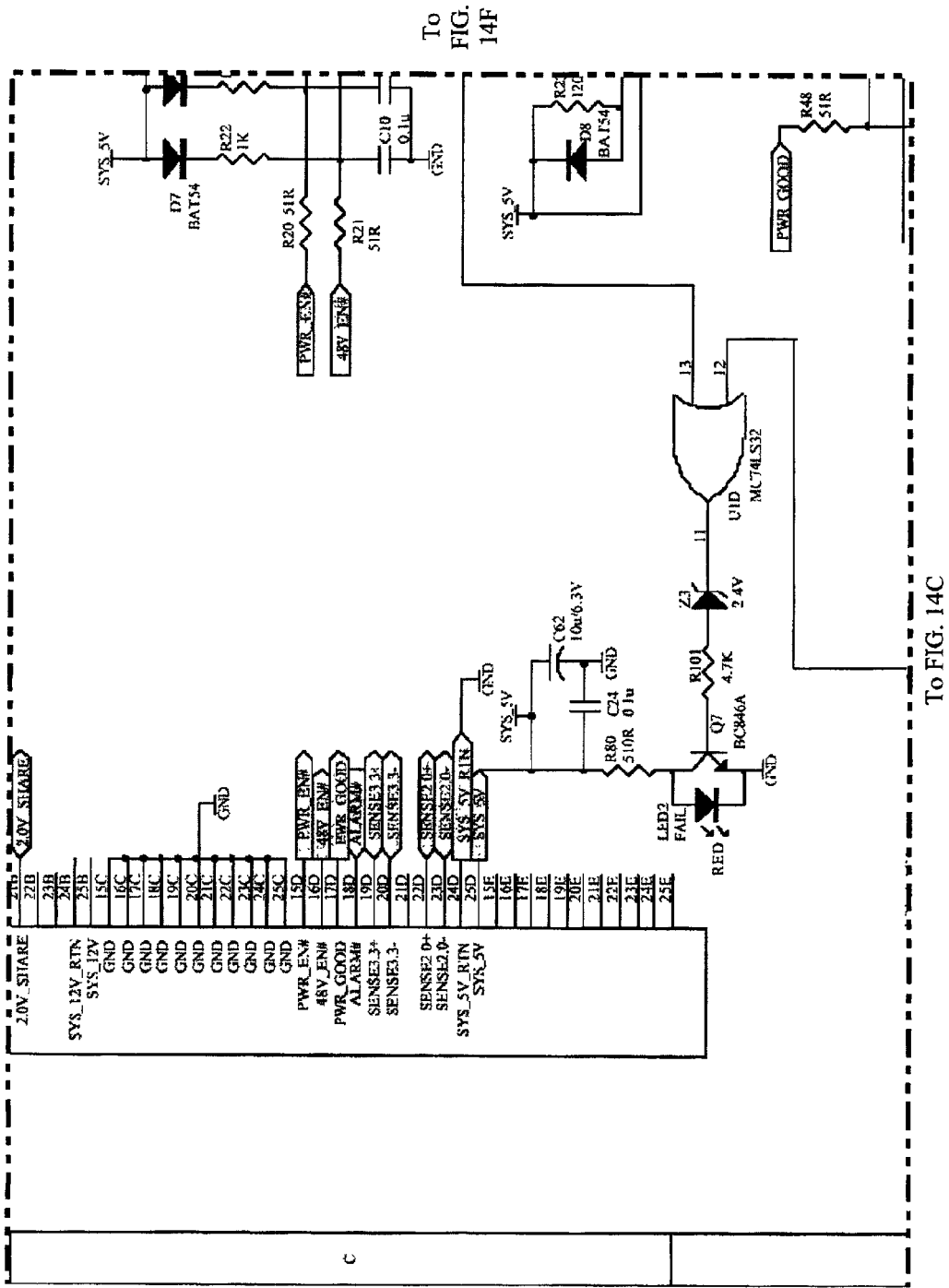
Figure 14C:
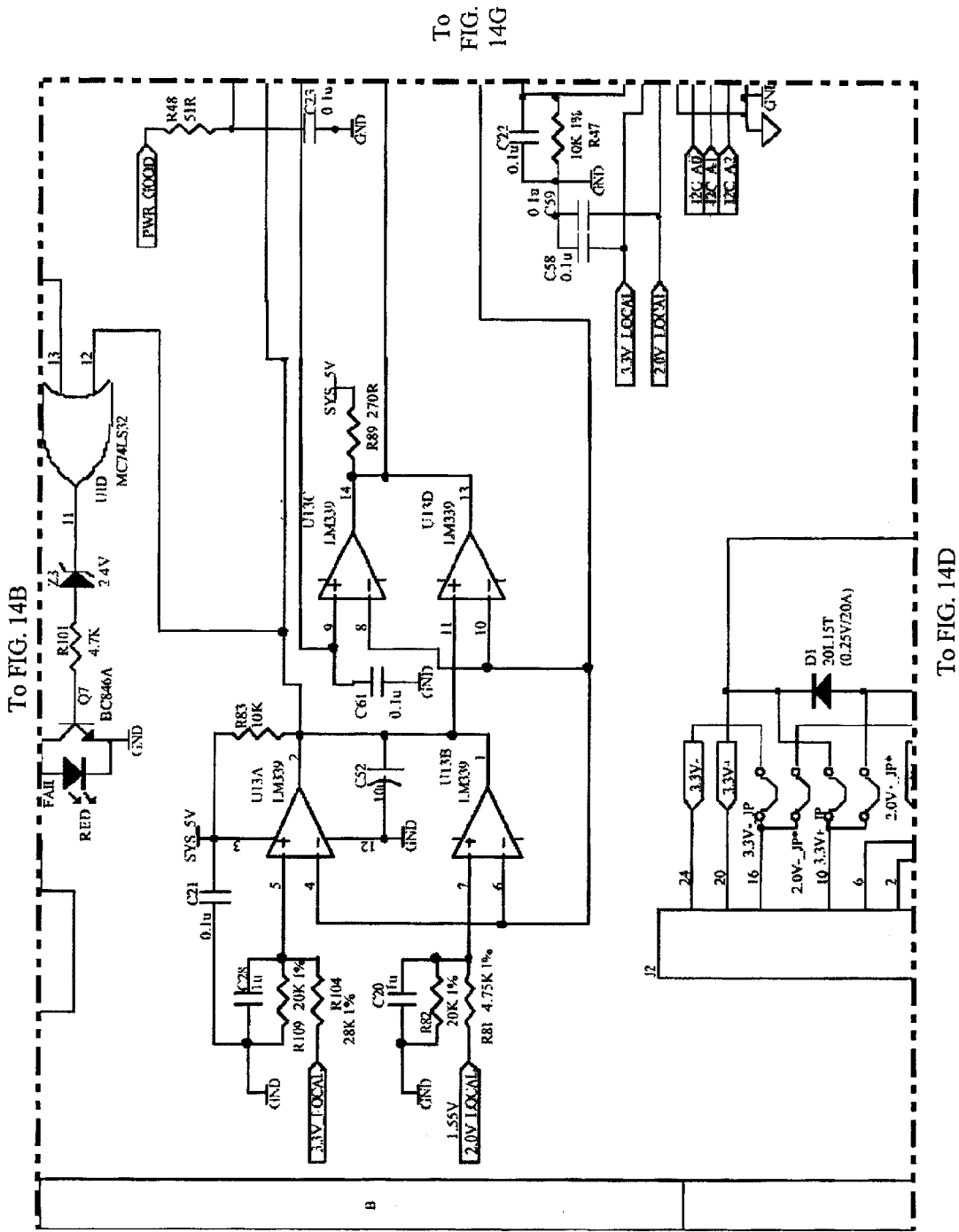
Figure 14D:
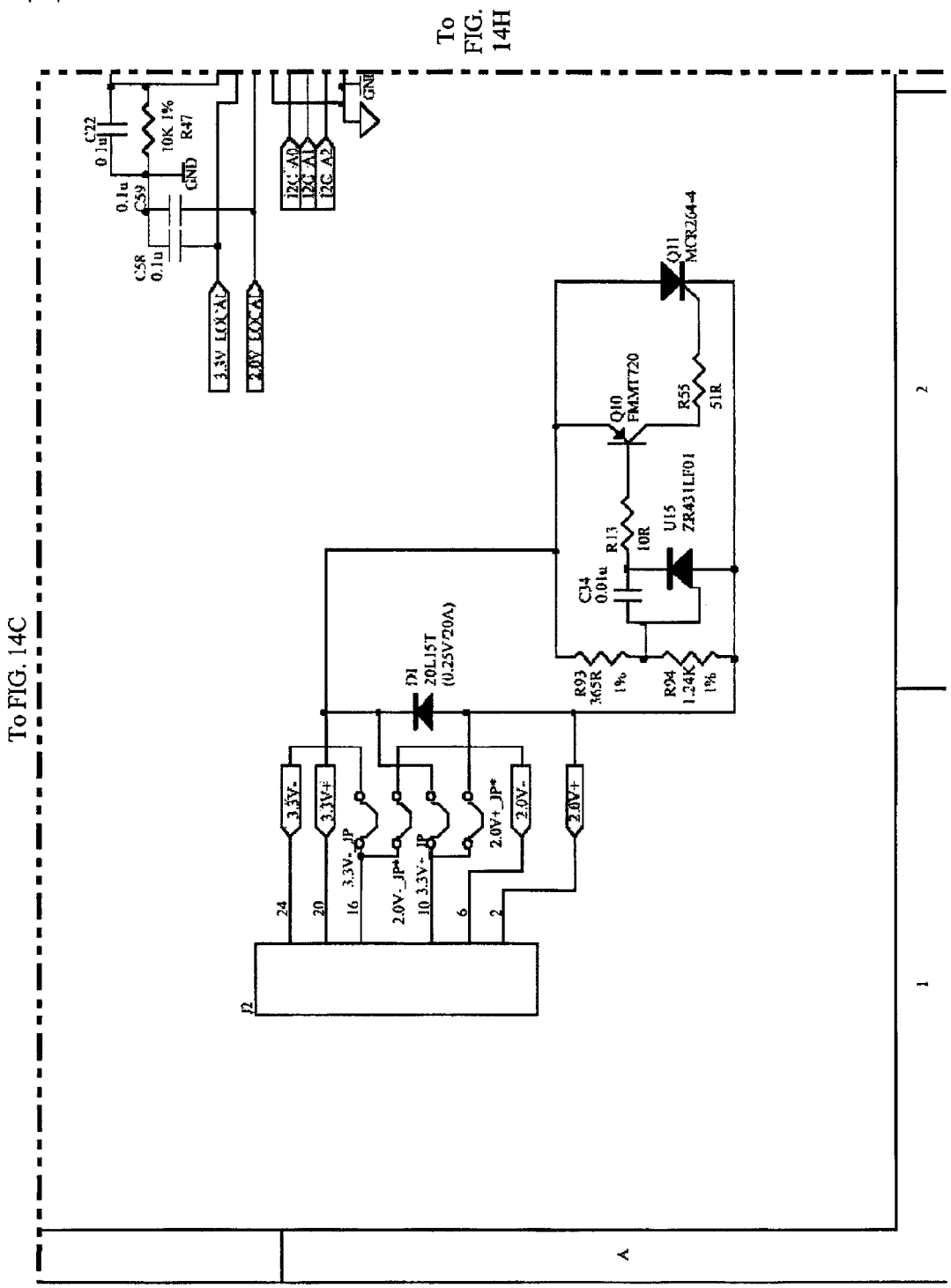
Figure 14E:
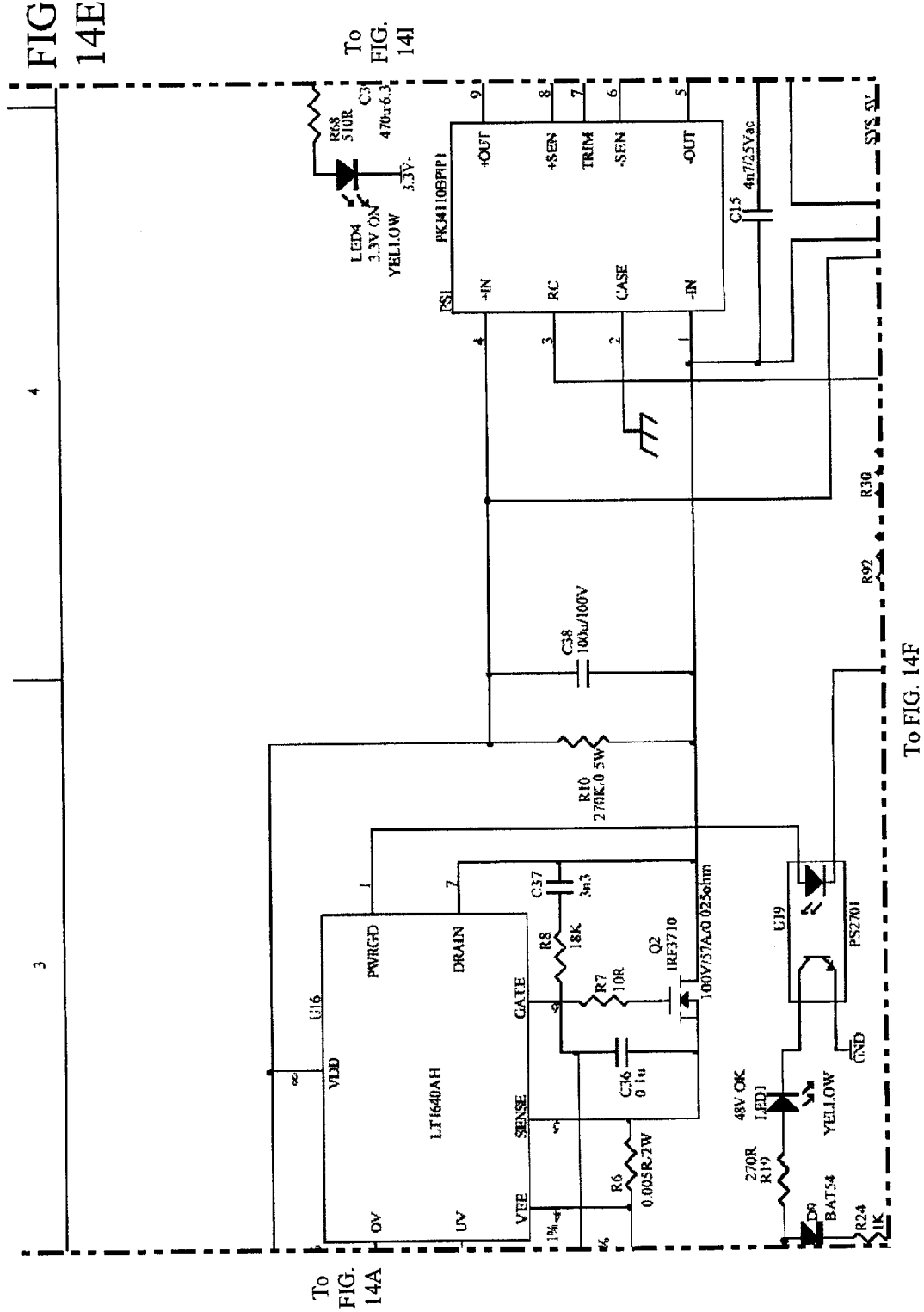
Figure 14F:
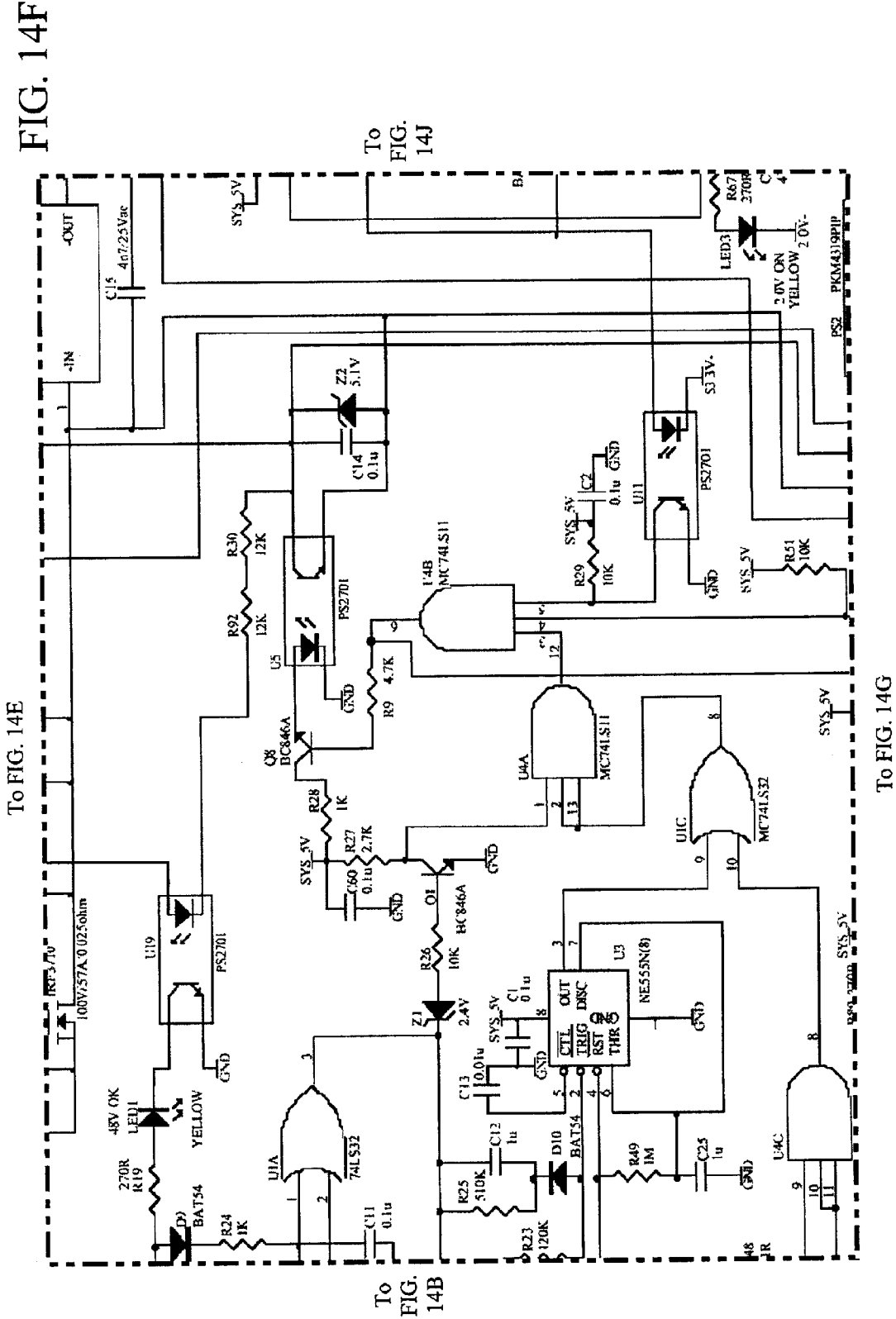
Figure 14G:
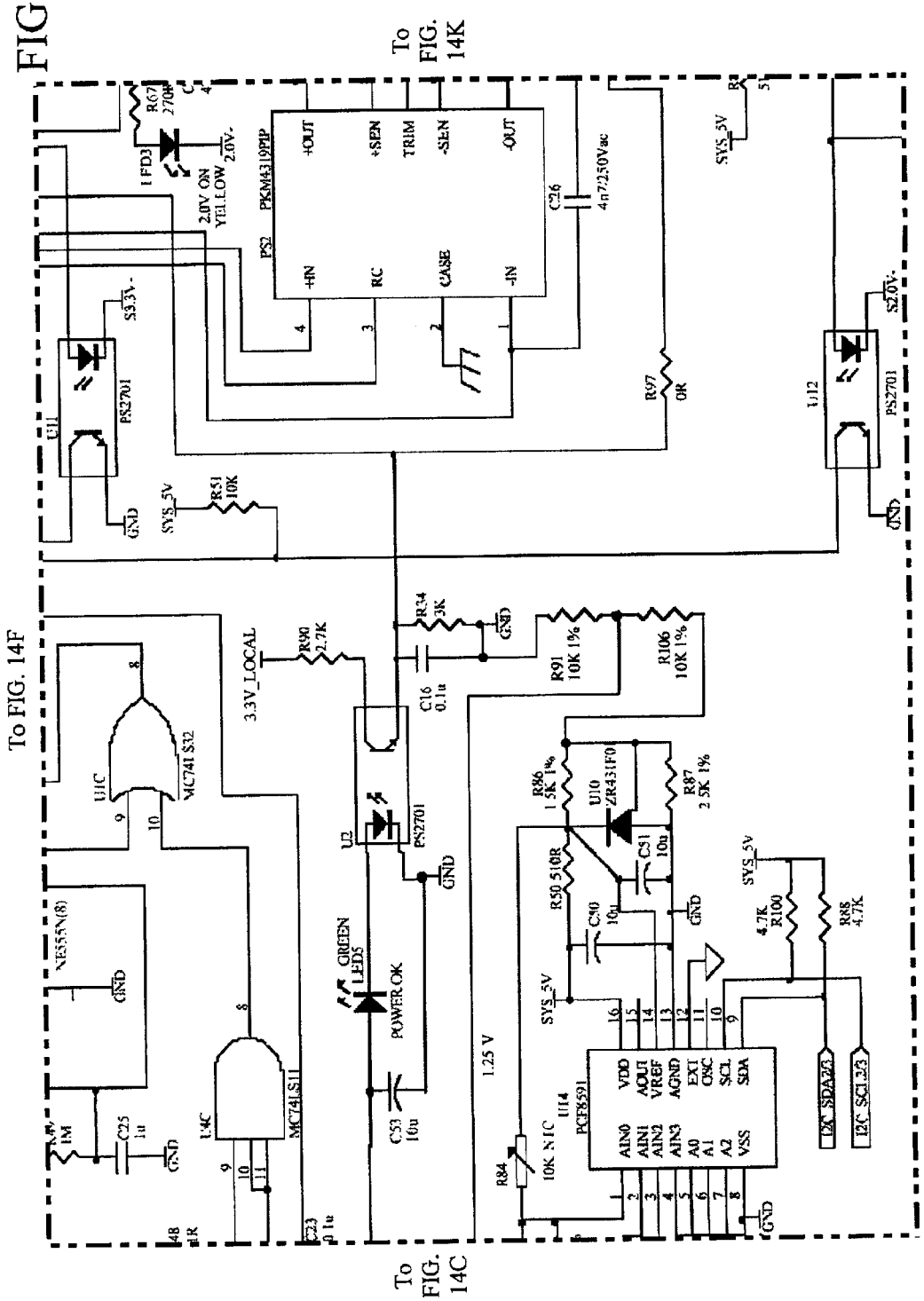
Figure 14H:
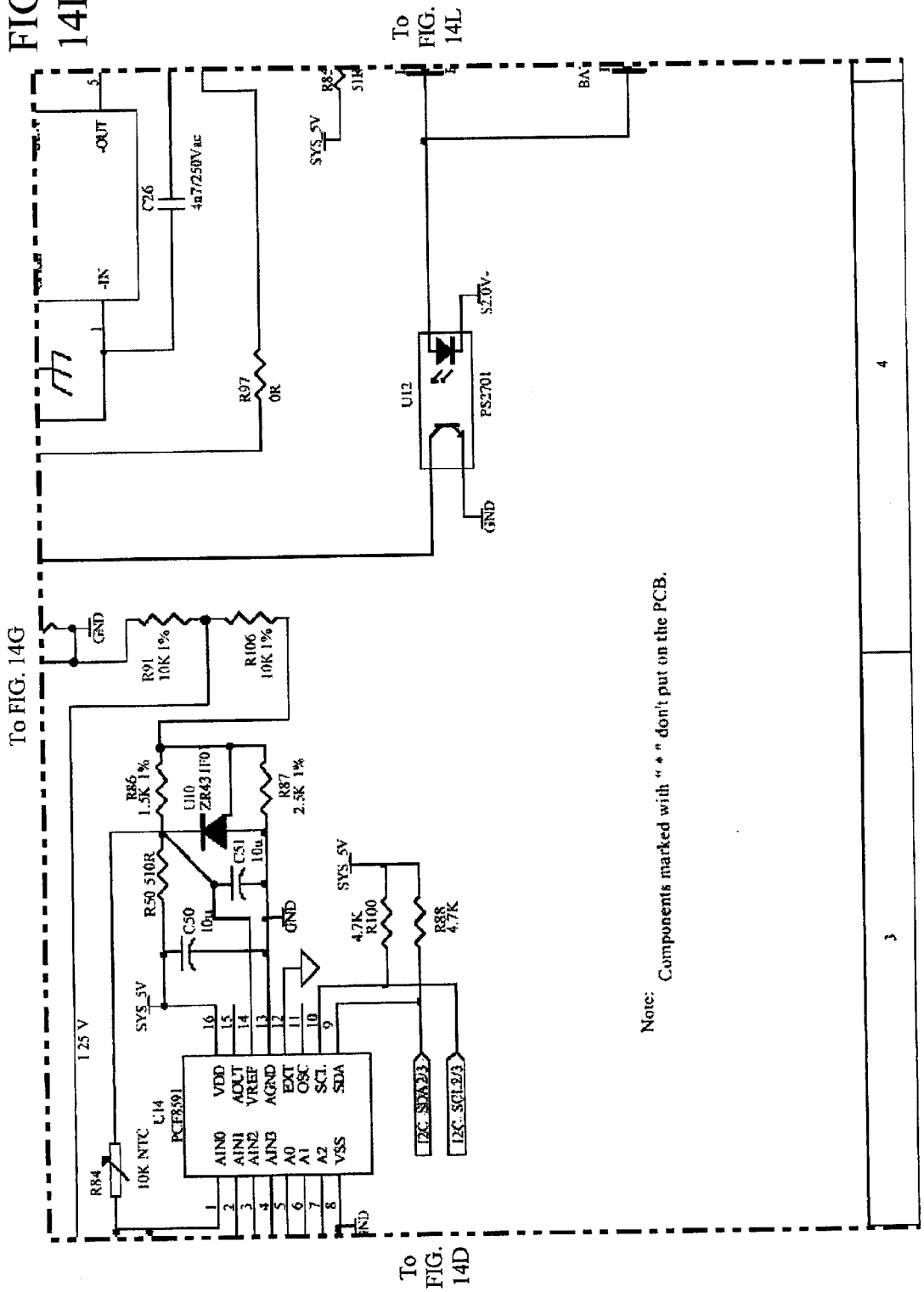
Figure 14I:
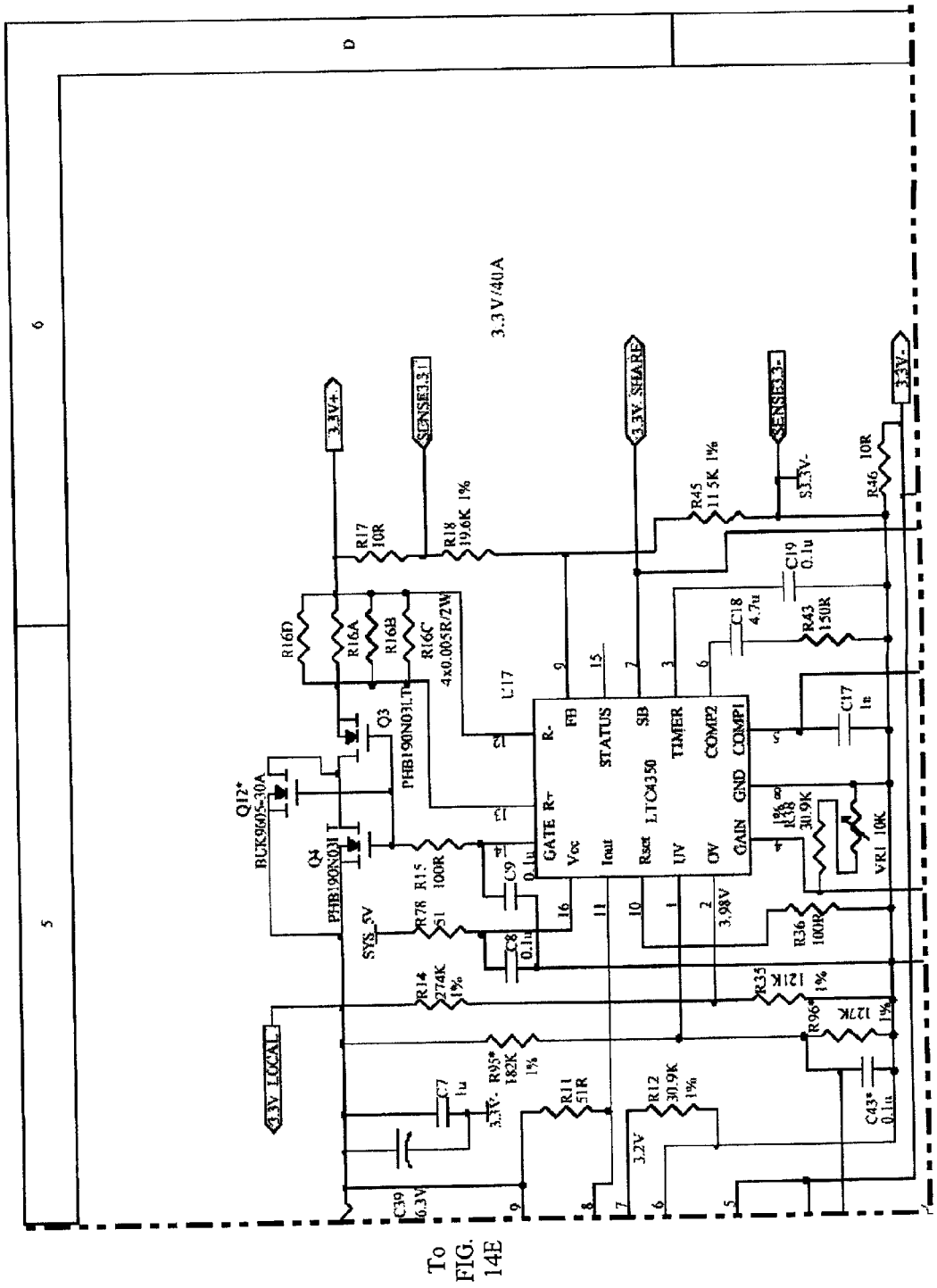
Figure 14J:
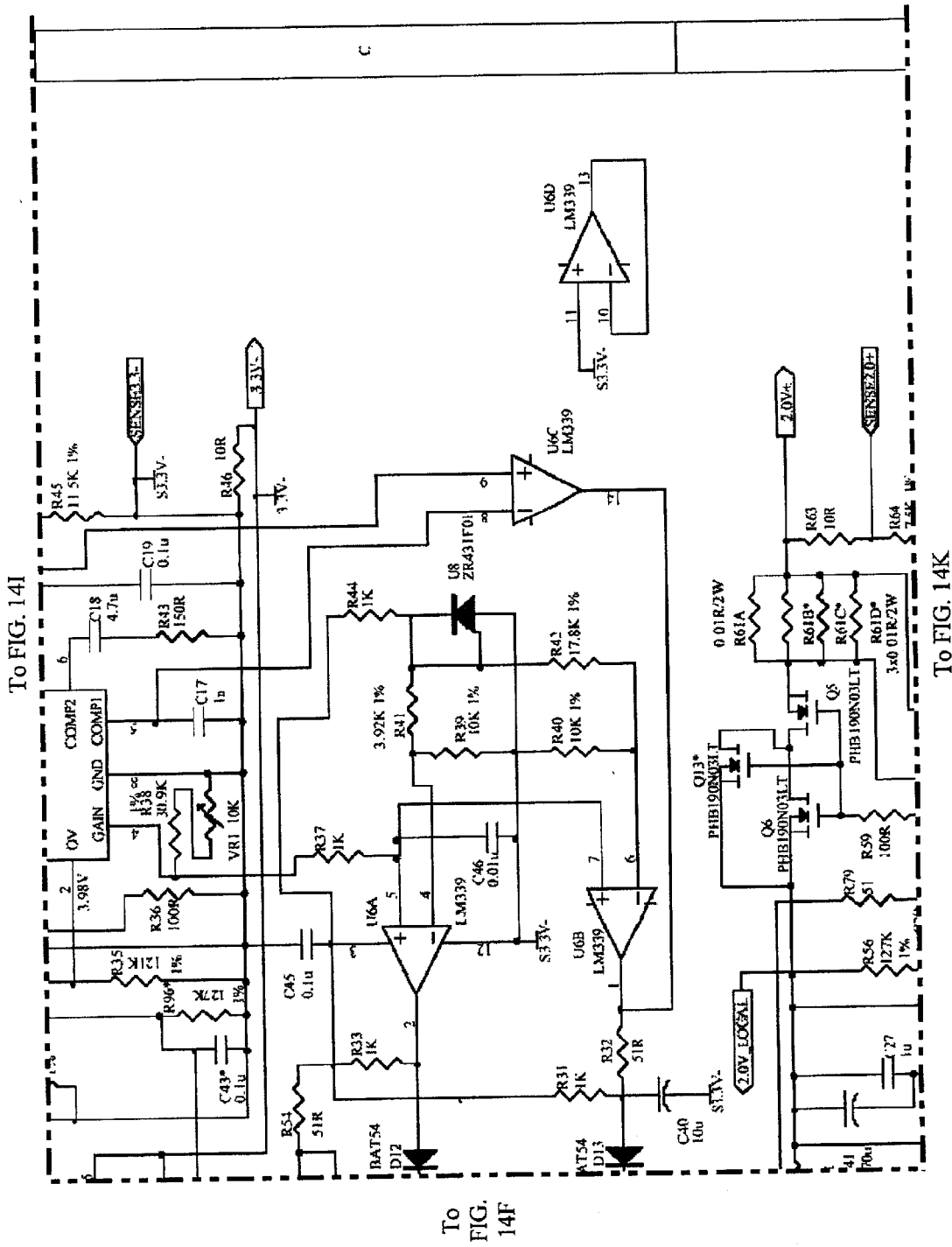
Figure 14K:
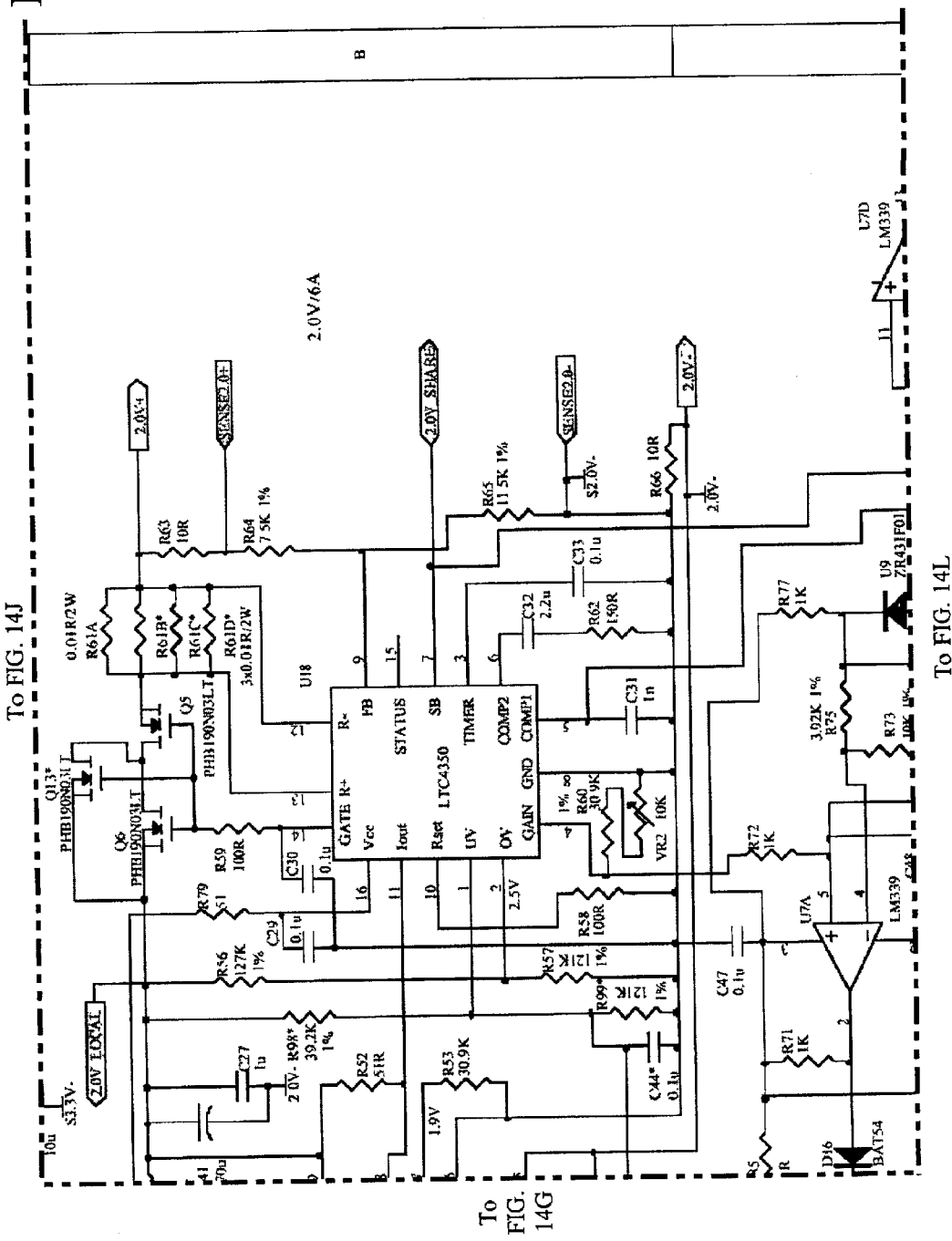
Figure 14L:
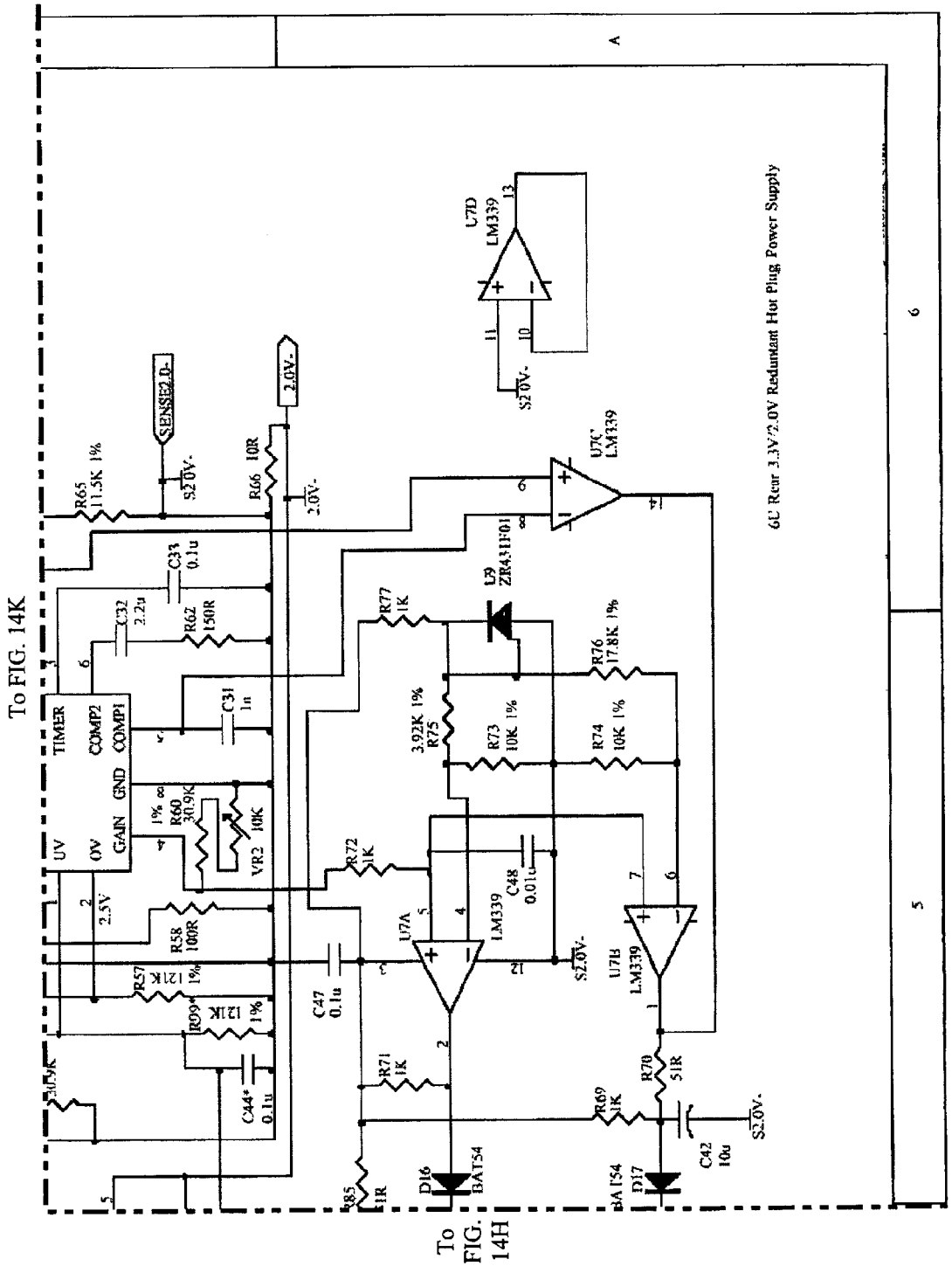

FIG. 10 depicts a block diagram of an exemplary Monitoring, Alarm and Peripheral Module ("MAPM") 304 for use with the embodiment of FIGS. 1 and 2. The MAPM 304 monitors all of the power supply boards 212, 214 and their associated loads 104A–G. If the MAPM 304 detects a failure in any load 104A–G, it will shut down the corresponding power supply pair 216A–G. Further, the MAPM 304 will shut down the system input power if catastrophic failures occur, such as a failure during power up of the system 102. FIG. 11 depicts a block diagram showing the system architecture of the Monitoring, Alarm and Peripheral Module 304 of FIG. 10.

Figure 16:
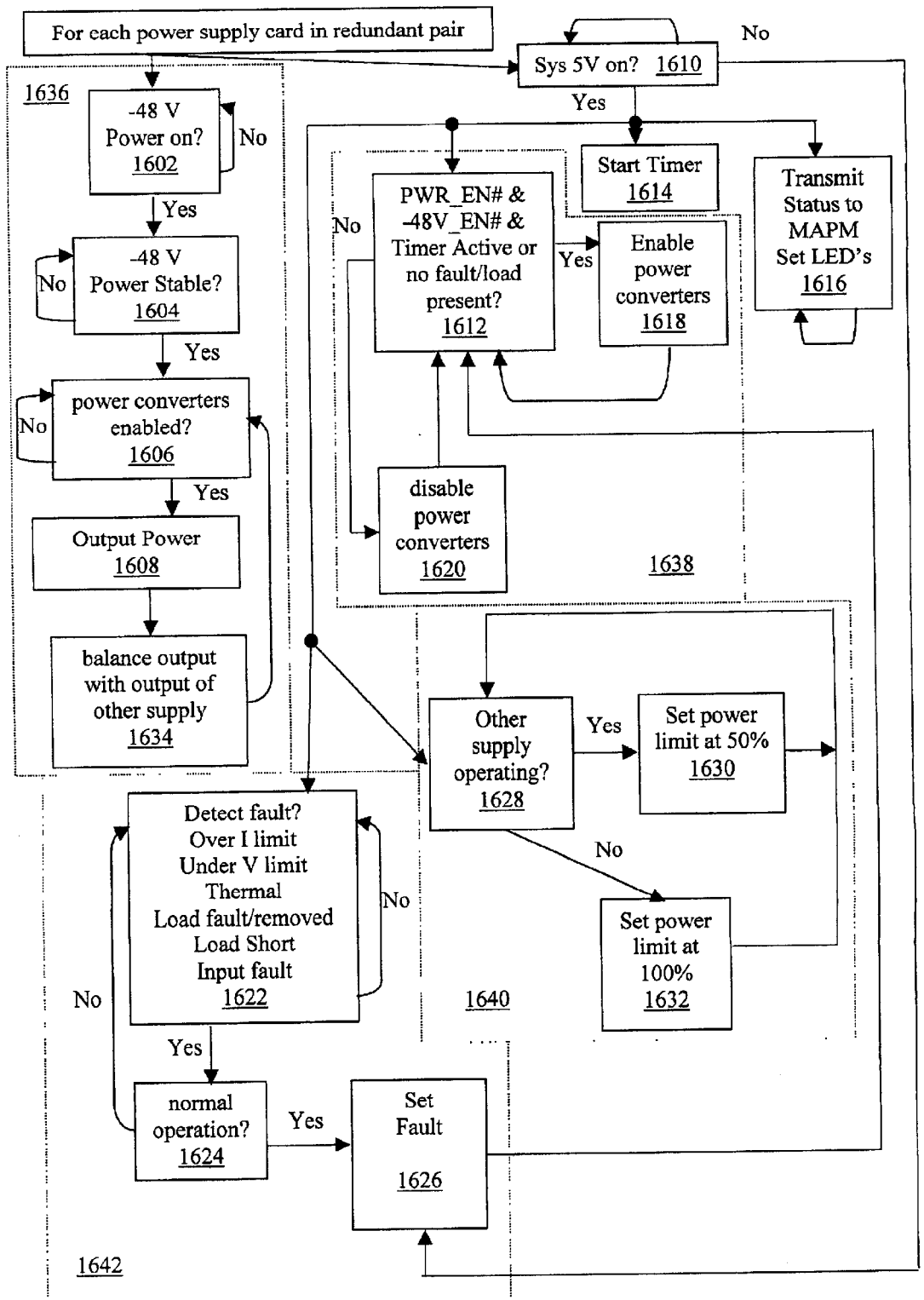
FIG. 16 depicts a flow chart showing the various operational modes of the power supplies shown in FIGS. 5 and 15.

FIG. 16 depicts a flow chart showing logical operation of each power supply board 212A, 214A in an exemplary set 216A–G of redundant power supply boards 212A, 212B, 214A, 214B under normal operating conditions. Upon plugging a power supply board 212A, 214A into the power backplane 208 which is currently powered on, or powering on the system 102 power in which the power supply board 212A, 214A is currently plugged in, the −48 Volt system input power and the 5 Volt system low power input are simultaneously provided to the power supply board 212A, 214A (blocks 1602, 1610). In addition, the connection with the associated load 104A–G is also simultaneously effected. Several parallel functional paths are thereby triggered into operation. While the flow charts show a logical depiction of the power supply 212A, 214A operation, it will be appreciated that they represent the operation of analog based circuitry.

In the first functional path 1636, if the system power input is on (−48 V) (block 1602), the hot swap controller 508 begins to stabilize the input power (block 1604). Once the input power is stable (block 1604), it will be passed onto the power converters 502, 504. If the system power is not on, then the power supply 212A, 214A waits for it to turn on (block 1602). One the system input power is stable, and if the power converters 502, 504 are enabled (1606), they will output the converted power (either 1.8, 2.0 or 3.3 volts at the prescribed Amperage) (block 1608) to the load sharing controllers 518A, 518B which will then act to balance the power output with the output of the other counterpart power supply (block 1634) as was described above. As long as the power converters 502, 504 are enabled and there is system power supplied and stable, this functional path 1636 will continue to operate. This functional path 1636 resets when the system power is removed or otherwise fails.

The remaining functional paths are triggered, effectively, by the application of the 5 volt system low power input 1526 (block 1610) since the logic which implements these functions is powered by the system low power input 1526. In one functional path, the timer of the power on sequencer 1508 is activated (block 1614). In one embodiment, the timer counts down for 500 milliseconds. Alternatively, the timer is set for as long as necessary to establish that the power supply 212A, 212B has reached a stable state. In an alternate embodiment, the power on sequencer 1508 and timer may be replaced with a different signal which indicates that the system is powering up and that faults should be inhibited until the power supply 212A, 214A is completely powered up. Further, the temperature/voltage monitor 1512 is activated to start sending status to the MAPM 304 and the LED visual indicators 512 are enabled (block 1616). Note that if the system low power input 1526 fails, this by default, will cause a fault condition and disabling of the power converters because the logic which detects faults is driven by this low power input 1526 and therefore will cease to function if it fails.

In another functional path 1638, the enable logic 1518 determines the status of the system power enable signal 1524, a hot swap complete signal 1522, power limit comparator output 1536 and the timer output/on-board power monitoring output 1542 (block 1612). If all of these signals are asserted, the power converters 502, 504 are enabled (block 1618). If one or more of these signals are not asserted, then the power converters 502, 504 are disabled. The input signals to the enable logic 1518 are continually monitored to enable or disable the power converters 502, 504 as required. Note, as described above, that the timer of the power on sequencer 1508 started in block 1614 acts to keep the enable logic 1518 input 1542 from the on-board power monitor 1510 asserted during the start-up phase of the power supply 212A, 214A. Further, the RC delay circuit 1514 acts to keep the input 1536 to the enable logic 1518 from the power limit comparator 1516 asserted during the start-up phase as well.

Another functional path 1640 monitors the other power supply 212B, 214B to determine when the power limit for the power limit comparator 1516 should be raised. The output of the other power supply 212B, 214B is continuously monitored via the sense line 516A, 516B through the load sharing controller 518A, 518B (block 1628). When the sense line 516A, 516B shows zero voltage, indicating that the other supply 212B, 214B has failed or has removed, the power limit is raised to 100% (block 1632). This functionality works in concert with the load balancing performed by the load sharing controller 518A, 518B, the over-current detection by the on-board power limit comparator 1516 and the RC delay 1514. Effectively, as the power output of the failing supply 212B, 214B begins to drop, the load sharing controller 518A, 518B substantially instantaneously begins to ramp up to counter the deficit in power output as described above. When the output of the load sharing controller 518A, 518B crosses the pre-set power limit, the power limit comparator 1516 will attempt to send a signal to shut down the power supply 212A, 214A. However, this signal is delayed by the RC delay 1514. Before the shutdown signal can reach the enable logic 1518 through the RC delay 1514, the power output of the other supply 212B, 214B will have fallen enough to trip its under-voltage fault detection, thereby shutting it off completely. This drops the voltage on the sense line 516A, 516B, which instantly raises the power limit of the working supply to 100%. Now that the power limit has been raised, the signal to shut down the supply 212A, 214A, which is still delayed by the RC delay 1514, is effectively canceled out, leaving the power supply 212A, 214A free to ramp up to full power to take over for the failed supply 212B, 214B.

If the other supply 212B, 214B is replaced with a working supply 212B, 214B or otherwise restored to working condition, the process described will happen again. In this case, the sense signal 516A, 516B is immediately raised to indicate that the other supply 212B, 214B is now working which immediately lowers the power limit back to 50%. While the load sharing controller 518A, 518B is beginning to balance the power output with the output of the other supply 212B, 214B, as the other supply 212B, 214B ramps up, the working supply 212A, 214A will not yet have dropped its power output below the power limit, thereby triggering an over-current fault signal by the power limit comparator 1516. However, the over-current-fault signal, as described above, will be delayed by the RC delay circuit 1514, giving the load sharing controller 518A, 518B enough time to lower the power output, in balance with the other supply 212B, 214B, under the power limit and effectively cancel the over-current fault signal before it can reach the enable logic 1518.

Note that detection of the failure of the other power supply 212B, 214B must be balanced with the over-current fault detection because as the other supply's 212B, 214B output drops, the load sharing controllers 518A, 518B will automatically attempt to compensate. If a failure in the other supply 212B, 214B has not yet been detected, the power limit will not have been raised to 100%, thereby, when the load sharing controllers 518A, 518B attempt to increase the power output beyond 50% they may trigger an over-current fault and shutdown the power supply 212A, 214A. As described, a cascade failure of this type is prevented by ensuring that the margins for detecting failure of the other supply 212B, 214B, as well as for detecting an under-voltage fault are sufficiently less than the margin for detecting an over-current fault, i.e. the RC delay. In this way, the first power supply 212A, 214A will detect the failing supply and raise the power output limit prior to the already rising power output be able to trip an over-current fault shutdown. Further, the other supply 212B, 214B will also quickly trip an under-voltage fault and thereby shut down so as not to be operating at all as the first supply 212A, 214A ramps up to full power. It will be appreciated that there may be other ways to prevent such a cascade failure.

Further note that the above described logic for handling a failed supply is primarily used to detect failures which happen relatively quickly. In most cases for failures indicated by a slow degradation in power output, the MAPM 304, which is continually monitoring the power output, will see the degradation and take appropriate action well before the voltage drops enough to trigger the above functionality.

In yet another functional path 1642, faults are detected. Essentially, this functional path 1642 represents the activity of the on-board power monitor 1510, the power limit comparator 1516 and the load status input 520. Faults detected include over-current from the load sharing controllers 518A, 518B, under voltage from the power converters 502, 504, thermal fault, loading short circuit, a fault in the load 104A–G or removal of the load 104A–G, and a fault in the system power input or system low power input 520 (block 1622). Note that the power supply 212A, 214A must be in normal operating mode, i.e. the hot swap controller 508 has allowed the system input power to stabilize, the timer of the power-on sequencer 1508 has expired, and enough delay has passed to allow signals to propagate through the RC delay circuit 1514 (block 1624). At this point, failing conditions cause the appropriate input to the enable logic 1518 to deassert (block 1626) thereby disabling the power converters (blocks 1612, 1620). In operation, faults are detected when the measured value deviates from a pre-defined threshold +/− an error margin. In one embodiment, an over-current fault is determined when the output current of the load sharing controllers 518A, 518B exceeds 1.0% of the maximum current limit. If the maximum current limit is 40 Amps, then an over-current fault is detected when the current exceeds 40.4 Amps (20.2 Amps for a 20 Amp maximum, etc). As described above, the over-current fault signal is delayed via the RC delay 1514 to give ample opportunity to cancel the fault signal should it be determined that increasing power output was a legitimate response to a failure of the other power supply 212B, 214B.

An under-voltage fault is determined when the voltage output of the power converters 502, 504 drops below 1.25 Volts. In one embodiment, an under-voltage fault on one power converter 502 causes both power converters 502, 504 to shut down. A thermal fault is determined when the load power monitor 1510 detects that the temperature has exceeded approximately 75 degrees Celsius, however alternate thresholds may be used depending upon the implementation. As described above, the over-current and under-voltage fault thresholds and error margins may be adjusted along with the companion power supply 212B, 214B failure detection threshold, to prevent cascade failures of both power supplies 212A, 214A, 212B, 214B as described above.

Note that the power converter 502, 504 components themselves may provide under-voltage and thermal fault detection. In one embodiment where the power converters 502, 504 include the Ericsson PKJ 4110, PKM 4319, PKJ 4718, or PKM 4510, the power converters 502, 504 will shut themselves off if their output voltage drops below ⅔ of their standard output voltage (1.8, 2.0 or 3.3 Volts as the case may be) or if the operating temperature exceeds 110 degrees Celsius. Also note that once the power converter 502, 504 shuts itself off, its output voltage will of course drop to 0 Volts. This will be detected as an under-voltage condition by the on board power monitor 1510 which will then disable the power converters 502, 504, as noted above, shutting off the non-failing power converter 502, 504 as well.

Further, the power converters 502, 504 provide the primary loading short fault detection. If there is a short circuit on the load outputs from the power supply board 212, 214 or power inputs to the associated load 104A–G, the power converters 502, 504 will shut themselves off. Note that the over-current detection will detect the short circuit as an over current fault, however, the power converters 502, 504 will generally act faster to shut themselves off before the over current fault can be detected. In this situation, the over current protection acts as a failsafe should the power converters 502, 504 fail to shutdown in the presence of a loading short fault.

It will be appreciated that there may be many different ways to implement the disclosed logic and power handling functionality, either with analog or digital components, whether discrete or integrated, or combinations thereof. It is therefore intended that the foregoing detailed description be regarded as illustrative rather than limiting, and that it be understood that it is the following claims, including all equivalents, that are intended to define the spirit and scope of this invention.

We claim:

1. A method for supplying electrical power to a first load using first and second power supplies each coupled with said first load, said first load characterized by an electrical power requirement, said method comprising:
   (a) supplying electrical power to meet said electrical power requirement such that said first power supply supplies a portion of said electrical power not supplied by said second power supply;
   (b) detecting failure of said second power supply;
   (c) adjusting said first power supply to supply said electrical power requirement upon said detection; and
   (d) preventing said first power supply from supplying more than said portion of said electrical power not supplied by said second power supply when said second power supply has not failed.

2. The method of claim 1, wherein said preventing further comprises preventing said first and second power supplies from exceeding said electrical power requirement.

3. The method of claim 1, further comprising:
   (e) deactivating said first and second power supplies upon detection of failure of said first load.

4. The method of claim 1, further comprising:
   (e) applying input power to said first and second power supplies;
   (f) at least one of adding and removing one of said first and second power supplies;
   (g) monitoring for a failure during (e) and (f); and
   (h) deactivating said input power to said first and second power supplies in response to detection of said failure.

5. The method of claim 1, wherein said first load comprises a circuit board coupled with a first backplane, said method further comprising:
   (e) coupling said first and second power supplies with a second backplane, said first backplane being coupled with said second backplane.

6. The method of claim 1, further comprising:
   (e) providing third and fourth power supplies each coupled with a second load; and
   (f) isolating a fault in at least one of said third and fourth power supplies from said first and second power supplies such that said fault does not affect operation of said first and second power supplies.

7. The method of claim 1, wherein said first and second power supplies are coupled with a first ground plane, said method further comprising:
   (e) providing third and fourth power supplies each coupled with a second load, and wherein said third and fourth power supplies are coupled with a second ground plane; and
   (f) isolating said first ground plane from said second ground plane.

8. The method of claim 1, further comprising:
   (e) providing a first power distribution bus, said first power distribution bus operative to couple said first and second power supplies to said first load;
   (f) providing third and fourth power supplies each coupled with a second load by a second power distribution bus; and (g) isolating said first power distribution bus from said second power distribution bus.

9. An apparatus for supplying power to a first load using first and second power supply means each coupled with said first load, said first load characterized by an electrical power requirement, said apparatus comprising:
(a) means for supplying electrical power to meet said electrical power requirement such that said first power supply supplies a portion of said electrical power not supplied by said second power supply;
(b) means for detecting failure of said second power supply;
(c) means for adjusting said first power supply to supply said electrical power requirement upon said detection; and
(d) means for preventing said first power supply from supplying more than said portion of said electrical power not supplied by said second power supply when said second power supply has not failed.

10. The apparatus of claim 9, wherein said apparatus further supplies power to a second load using third and fourth power supply means each coupled with said second load, said apparatus further comprising:
(e) means for isolating a fault in at least one of said third and fourth power supply means such that said fault does not affect operation of said first and second power supply means.

11. The apparatus of claim 9, wherein said first and second power supply means are coupled with a first ground plane, and wherein said apparatus further supplies power to a second load using third and fourth power supply means each coupled with said second load, said third and fourth power supply means being coupled with a second ground plane, said apparatus further comprising:
(e) means for isolating said first ground plane from said second ground plane.

12. The apparatus of claim 9, wherein said apparatus further supplies power to a second load using third and fourth power supply means each coupled with said second load, said apparatus further comprising:
(e) a first power distribution means for distributing power to said first load from said first and second power supply means;
(f) a second power distribution means for distributing power to said second load from said third and fourth power supply means; and
(g) means for isolating said first power distribution means from said second power distribution means.

13. A system for supplying electrical power to a first load characterized by an electrical power requirement, said system comprising:
first and second power supplies coupled with said first load and operative to supply electrical power to meet said electrical power requirement such that said first power supply supplies a portion of said electrical power not supplied by said second power supply;
a power supply controller coupled with said first and second power supplies and operative to detect failure of said second power supply, said power supply controller being further operative to adjust said first power supply to supply said electrical power requirement upon failure of said second power supply and prevent said first power supply from supplying more than said portion of said electrical power not supplied by said second power supply when said second power supply has not failed.

14. The system of claim 13, wherein said power supply controller is further operative to prevent said first and second power supplies from exceeding said electrical power requirement.

15. The system of claim 13, wherein said power supply controller is further operative to detect failure of said first load, said power supply controller operative to deactivate said first and second power supplies upon detection of said failure of said first load.

16. The system of claim 13, further comprising:
an input power supply operative to supply electrical power to said first and second power supplies; and
wherein said power controller is further operative to deactivate said input power during a failure occurring during one of system power on, inserting one of said first and second power supplies and removing one of said first and second power supplies.

17. The system of claim 13, wherein said first load comprises a circuit board coupled with a first backplane, said system further comprising:
a second backplane to which said first and second power supplies are coupled, wherein electrical power flows to said circuit board through said first and second backplanes.

18. The system of claim 13, further comprising:
third and fourth power supplies coupled with a second load; and
wherein said first and second power supplies are isolated from said third and fourth power supplies such that a fault in at least one of said third and fourth power supplies does not affect operation of said first and second power supplies.

19. The system of claim 13, wherein said first and second power supplies are coupled with a first ground plane, said system further comprising:
third and fourth power supplies coupled with a second load, and wherein said third and fourth power supplies are coupled with a second ground plane; and
wherein said first ground plane is isolated from said second ground plane.

20. The system of claim 13, wherein said first and second power supplies are coupled with a first power distribution bus, wherein said first power distribution bus is operative to distribute power from said first and second power supplies to said first load, said system further comprising:
third and fourth power supplies coupled with a second power distribution bus, wherein said second power distribution bus is operative to distribute power from said third and fourth power supplies to said second load; and
wherein said first power distribution bus is isolated from said second power distribution bus.

* * * * *

UNITED STATES PATENT AND TRADEMARK OFFICE
CERTIFICATE OF CORRECTION

| | | |
|---|---|---|
| PATENT NO. | : 6,737,763 B2 | Page 1 of 1 |
| APPLICATION NO. | : 10/024866 | |
| DATED | : May 18, 2004 | |
| INVENTOR(S) | : Jixue J. Liu et al. | |

It is certified that error appears in the above-identified patent and that said Letters Patent is hereby corrected as shown below:

On the Title Page

Item (54), before "INTELLIGENT LOAD SHARING" insert --SYSTEM AND METHOD FOR--.

In the Specification

In column 1, line 1, before "INTELLIGENT LOAD SHARING" insert --SYSTEM AND METHOD FOR--.

Signed and Sealed this

Twelfth Day of December, 2006

JON W. DUDAS
*Director of the United States Patent and Trademark Office*